United States Patent

Aruga et al.

[11] Patent Number: 6,085,137
[45] Date of Patent: Jul. 4, 2000

[54] VEHICLE CONTROL DEVICE

[75] Inventors: Hideki Aruga; Hisanori Shirai, both of Aichi-ken, Japan

[73] Assignee: Kabushikikaisha Equos Research, Japan

[21] Appl. No.: 09/101,030

[22] PCT Filed: Oct. 27, 1997

[86] PCT No.: PCT/JP97/03887

§ 371 Date: Jun. 25, 1998

§ 102(e) Date: Jun. 25, 1998

[87] PCT Pub. No.: WO98/19083

PCT Pub. Date: May 7, 1998

[30] Foreign Application Priority Data

Oct. 25, 1996 [JP] Japan .................................. 8-301273
Nov. 2, 1996 [JP] Japan .................................. 8-307295
Nov. 6, 1996 [JP] Japan .................................. 8-311342

[51] Int. Cl.[7] .................................................. F16H 61/18
[52] U.S. Cl. ............................. 701/51; 701/55; 701/65; 477/120
[58] Field of Search .................................. 701/55, 51, 56, 701/57, 61, 62, 64, 65; 477/95, 120, 144

[56] References Cited

U.S. PATENT DOCUMENTS 5,893,894  4/1999  Moroto et al. ............................ 701/53

FOREIGN PATENT DOCUMENTS 51-22697   7/1976   Japan .
62-292947  12/1987  Japan .
5322591    12/1993  Japan .
8159278    6/1996   Japan .

Primary Examiner—Tan Nguyen
Attorney, Agent, or Firm—Lorusso & Loud

[57] ABSTRACT

There is disclosed a vehicle control system that controls an automatic transmission by utilizing road information stored in a navigation system unit. In response to the road information stored in a data memory, the upper-limit of a shiftable gear ratio range is determined, thereby allowing change of the gear ratio only within the restricted range. The actual downshift is carried out in response to initiation of a decelerating operation by the driver, such as release of the accelerator pedal, which prevents unnecessary upshift and provides favorable transmission control in conformity with the driver's intention.

32 Claims, 16 Drawing Sheets

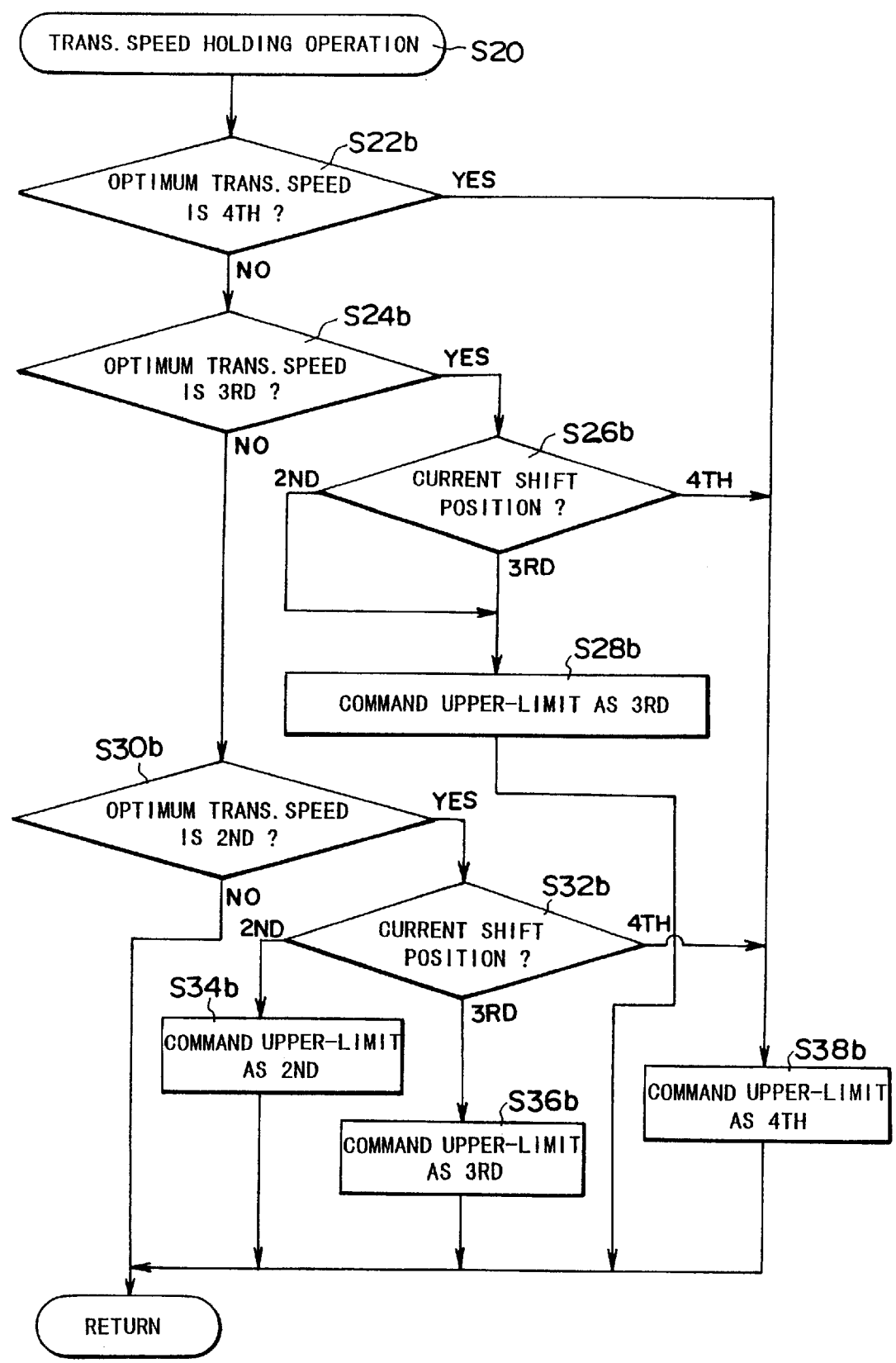

VEHICLE CONTROL DEVICE

TECHNICAL FIELD

This invention relates to a vehicle control device that conducts vehicle control based on road information, and more particularly to a vehicle control device that controls transmission gear ratios based on information of the road ahead.

BACKGROUND OF THE ART

Among the prior art systems for controlling transmission speed by utilizing road data stored in a navigation system, Japanese patent publication No. 6-272753 has proposed a control device that controls transmission speed based on various items of information, including vehicle speed variation and degree of accelerator opening, that can be detected by sensors, and map information read out from the navigation system. Such a device controls a vehicle to have an optimum transmission speed in conformity with variations in the drive conditions.

With the above-described prior art transmission control devices, road data is obtained from the navigation system in order to determine a transmission speed in conformity with the conditions of the road on which the vehicle is currently travelling. However, all operating parameters used in such prior art control merely indicate the current drive conditions. With the prior art systems it is not at all possible to control the transmission in anticipation of future change in the drive conditions.

For example, when the vehicle goes up a slope, the prior art control device can not change transmission speed until the vehicle ascends to a certain level that results in a change in actual vehicle speed or in the degree of accelerator opening. Moreover, this control tends to follow the road information but neglects the driver's will or intention. More specifically, the transmission speed control based on the road information has a good adaptability to surrounding conditions, but tends to force a perfunctory control on the driver.

Further, when the vehicle is about to enter a winding stretch of road, the transmission should be controlled to keep gear ratios within a relatively low range. However, in accordance with the prior art control, the transmission speed would be upshifted in response to release of the accelerator pedal, which reduces drive power and thus does not allow smooth acceleration in accordance with the driver's intention. When the vehicle enters a curve with the accelerator pedal not depressed, it is difficult to provide appropriate transmission control in accordance with the driver demands.

Accordingly, it is an object of this invention to achieve vehicle control that conforms well to the driver's intention, and more particularly to provide a vehicle control system that achieves more favorable control in response to a decelerating operation by the driver.

SUMMARY OF THE INVENTION

To achieve the above object, this invention provides a vehicle control system including:

road information obtaining means for obtaining road information, current position sensor means for detecting an on-road current position of a vehicle, an automatic transmission, optimum gear ratio determining means for determining, in accordance with said road information, an optimum gear ratio for travel of the vehicle from the current position detected by said current position sensor means through a specific forward position, decelerating operation sensor means for detecting that the driver has initiated a decelerating operation, drive condition sensor means for detecting at least one of drive parameters including vehicle speed, primary upper-limit setting means for setting said optimum gear ratio determined by said optimum gear ratio determining means as a primary upper-limit gear ratio, in response to detection of initiation of the driver's decelerating operation by said decelerating operation sensor means, secondary upper-limit setting means for determining a specific gear ratio as a secondary upper-limit gear ratio, independent of detection of initiation of said driver's decelerating operation, after setting of said primary upper-limit gear ratio by said primary upper-limit setting means, upper-limit gear ratio determining means for comparing said primary and secondary upper-limit gear ratios to select the lower one and outputting an upper-limit command designating said selected gear ratio, and restriction means for restricting a shiftable range of said automatic transmission by setting said upper-limit gear ratio designated by said upper-limit command.

Preferably, the drive condition sensor means includes a vehicle speed sensor, and the secondary upper-limit setting means determines said secondary upper-limit gear ratio in accordance with the detected vehicle speed. This function may be provided by means for calculating a reference vehicle speed, whereby the secondary upper limit setting means determines said secondary upper-limit gear ratio by comparing the vehicle speed detected by the vehicle speed sensor with the calculated reference vehicle speed.

Preferably, the drive condition sensor means also includes a current gear ratio sensor that detects the current gear ratio, and said secondary upper-limit set means determines said secondary upper-limit gear ratio in accordance with the detected current gear ratio. In this case, the secondary upper-limit setting means compares the detected current gear ratio with the optimum gear ratio determined by said optimum gear ratio determining means, and sets the current gear ratio as the secondary upper-limit gear ratio, when the optimum gear ratio is larger.

The secondary upper-limit setting means preferably includes curve detecting means for detecting a curve ahead on the road, said secondary upper-limit setting means determining the secondary upper-limit gear ratio in accordance with the vehicle speed at the time when the vehicle passes through the curve and with the current vehicle speed.

Preferably the drive condition sensor means further includes a current gear ratio sensor that detects the current gear ratio, and the secondary upper-limit setting means includes means for determining travel through the curve, the secondary upper-limit setting means determining the secondary upper-limit gear ratio in accordance with the vehicle speed during travel through the curve, the detected current gear ratio and an increase of the vehicle speed after passing through the curve.

The secondary upper-limit setting means may include means for determining that the vehicle has overrun the curve by a predetermined distance, so that the secondary upper-limit setting means can discontinue the upper-limit determining operation responsive to the determination that the vehicle has overrun the curve by the predetermined distance.

The curve may be represented by a series of nodes included in the stored road information.

In another embodiment, the vehicle control system includes road information obtaining means for obtaining road information, current position sensor means for detecting the current position of the vehicle, an automatic transmission, recommended speed calculating means for calculating, in accordance with the road information, a recommended vehicle speed for passage of the vehicle through a specific position on the road, distance calculating means for calculating distance from the current position to the specific position, vehicle speed sensor means for detecting a current vehicle speed, reference speed calculating means for calculating a reference vehicle speed at the current vehicle position in accordance with the recommended vehicle speed and the calculated distance, decelerating operation sensor means for detecting that the driver has begun a decelerating operation, discriminating means for determining if the current vehicle speed exceeds the calculated reference vehicle speed, first restriction means for determining a first restricted shiftable range of gear ratios, in response to detection of initiation of the driver's decelerating operation, when said discriminating means determines that the current vehicle speed exceeds the calculated reference vehicle speed, and second restriction means for determining a second restricted shiftable range of gear ratios, in accordance with the detected current vehicle speed, even when the decelerating operation sensor means detects no driver decelerating operation. The decelerating operation sensor may be an accelerator sensor for detecting release of the accelerator pedal and the first restriction means may be an upper-limit restriction means for restricting the upper-limit of the speed to which the transmission may be shifted, in response to detection of release of the accelerator pedal by said accelerator sensor means, when the discriminating means determines that the current vehicle speed exceeds the reference vehicle speed. The second restriction means may be an upshift prohibiting means for prohibiting an upshift from the current transmission speed, when the discriminating means determines that the current vehicle speed exceeds the reference vehicle speed and but no release of the accelerator pedal is detected.

The recommended speed calculating means calculates the recommended vehicle speed in accordance with the road shape of a predetermined road section including the specific position. For example, the recommended speed calculating means may calculate the recommended vehicle speed in accordance with radius of curvature of a predetermined road section including the specific position.

The decelerating operation sensor means may be a sensor which detects inoperative status of an accelerator pedal and/or operative status of a brake pedal. Alternatively, the decelerating operation sensor means may detect at least one of switch-on of a headlamp, switch-on of a turn indicating signal, switch-on of a wiper, decrease in degree of depression of an accelerator pedal or engagement of a brake pedal. "Inoperative status of the accelerator pedal" means that the degree of depression of the accelerator pedal is nearly zero, that it has decreased by a predetermined ratio, or that it has undergone a predetermined percentage of change, a predetermined amount of reduction, a predetermined rate of change, a predetermined rate of reduction, a predetermined acceleration of change or a predetermined deceleration.

The "inoperative status of the accelerator pedal" may also be detected as a change in throttle opening, i.e. shows at least one of a predetermined percentage of change, a predetermined amount of reduction, a predetermined rate of reduction or a predetermined deceleration.

The automatic transmission may have a plurality of transmission speeds, in which case the upper-limit gear ratio is an upper-limit transmission speed. Alternatively, it may be a variable speed transmission.

The vehicle control system may further include drive route searching means for searching to determine a travel route for the vehicle, and specific position means for determining position data for a specific position on the determined travel route from said road information obtaining means. Optionally, the system may also include goal set means for setting a goal wherein the drive route searching means determines a travel route to the goal when the goal has been set. The system may also set an imaginary drive route from the current position in the current vehicle direction when the goal has not yet been set. Another optional feature is a shift-position sensor which is mechanically or electrically connected to the automatic transmission for detecting shift position, whereby the primary and secondary upper-limit set means determining the primary and secondary upper-limits respectively in accordance with the detected drive shift position.

In another embodiment down-shift means executes a down-shift before the vehicle passes a predetermined position in a curve. Passage discriminating means determines if the vehicle has passed the predetermined position, and up-shift restriction means restricts a up-shift from the current transmission speed until the passage discriminating means determines that the vehicle has not yet passed the predetermined position. The up-shift restriction means allows an up-shift from the current transmission speed, at an up-shift point higher than that of normal transmission control, only after the vehicle is determined to have passed the predetermined position. Vehicle speed memory means may be utilized to store the vehicle speed at the time when the vehicle passes the predetermined position, the up-shift restriction means restricting a up-shift from the current transmission speed until the vehicle speed is increased to a predetermined speed that is higher than the vehicle speed at the time of passing the predetermined position, after the vehicle has passed the predetermined position.

Alternatively, the up-shift restriction means may restrict an up-shift from the current transmission speed until distance discriminating determines that the vehicle has passed ("overrun") the predetermined position by a predetermined distance.

BRIEF DESCRIPTION OF DRAWINGS

FIG. 16 is a flowchart of a transmission hold control sub-routine used in the third embodiment.

PREFERRED EMBODIMENTS OF THE INVENTION

Preferred embodiments of the present invention will be hereinbelow described with reference to the accompanying drawings.

Figure 1:
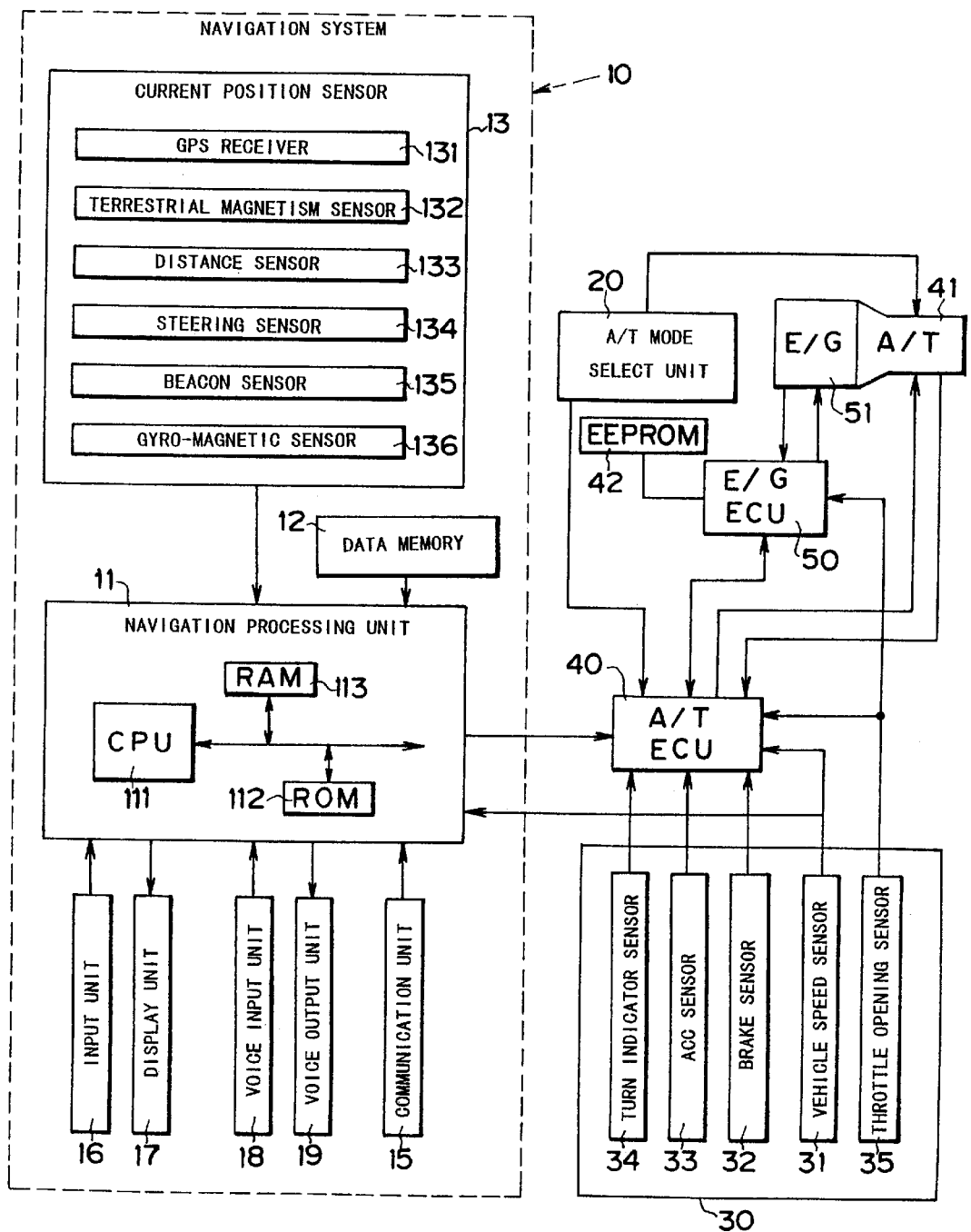
FIG. 1 is a block diagram showing a preferred embodiment of the present invention.

FIG. 1 shows vehicle control device 1 of this invention as including a navigation system 10, an automatic transmission 41, an A/T mode select unit 20 and a vehicle condition sensor 30. Navigation system 10 has a navigation processing unit 11, a data memory unit 12 that stores road information, a current position sensor 13, a communication unit 15, an input unit 16, a display unit 17, a voice input unit 18 and a voice output unit 19.

Navigation processing unit 11 has a central processing unit (CPU) 111 that operates in response to the input information to perform various data processing operations and to output the results of the operations. To CPU 111 are connected ROM 112 and RAM 113 through data bus lines. ROM 112 is a read-only-memory storing programs for searching to determine a travel route to the destination, for providing drive guidance along the travel route, and for determination of a certain section of the travel route, for example. RAM 113 is a random-access-memory to be used as a working memory when CPU 111 performs data processing operations.

Data memory unit 12 has a map data file, a street crossing data file, a node data file and data files for hotels, gas stations and sightseeing spots in respective areas. Data stored in these files are used not only for searching for a travel route, but also for providing various items of information, such as a guide map for the travel route, photographs and/or figures featuring street crossings and other features on the travel route, distance to a street crossing, drive direction at the street crossing, etc., through display 17 and/or voice output unit 19.

Among information stored in these files, the files respectively storing street crossing data, node data and road data are used in main for route searching in the navigation system. These files store data regarding road width, slope or gradient, road surface condition, radius of curvature, street crossings, T-shaped crossings, number of road lanes, lane merging points, entrance to the corner, railway crossings, exit ramps of expressways, tollgates, the points where road-width narrows, downhill grades, uphill grades, latitude and longitude absolute coordinates, altitude absolute coordinates, absolute position and altitude of nodes on roads, etc. Road information comprises the above-described data detected with regard to the current vehicle position, and comprises in main information for the road ahead of the current position in the driving direction. For example, such information includes street crossings positioned in advance on the travel route, corners, nodes and radii of curvature in predetermined section, distance from the current position to a predetermined point such as a street crossing or to a predetermined section, etc. The road information also includes various road conditions detected by respective sensors and obtained through communication means, etc.

Any memory devices such as DVD, MO, CD-ROM, optical disk, magnetic tape, IC card and optical card may be used to store the data files. Although CD-ROM or other memory device having great memory capacity is preferably used, an IC card may be used for other data files requiring less memory capacity. Data memory unit 12 constitutes the road information memory of the present invention.

Current position sensor 13 has a GPS receiver 131, a terrestrial magnetism sensor 132, a distance sensor 133, a steering sensor 134, a beacon sensor 135 and a gyro-magnetic sensor 136. GPS receiver 131 receives radio waves from earth satellites to determine the vehicle position. Terrestrial magnetism sensor 132 detects terrestrial magnetism to determine the direction in which the vehicle is advancing. Distance sensor 133 may be a measuring device of a type wherein the number of wheel rotations is detected followed by calculation or another type wherein acceleration is detected followed by double integration. Steering sensor 134 is typically an optical rotation sensor or a rotation-resistant volume mounted to a rotating steering member, but may be a steering angle sensor mounted to the wheel. Beacon sensor 135 receives positional information from beacons arranged beside the roads. Gyro-magnetic sensor 136 may be a gas-rate or vibration type gyro-magnetic sensor that detects a turning angle velocity of the vehicle followed by integration to determine the vehicle running direction.

GPS receiver 131 and beacon sensor 135 can be used alone to measure the vehicle position. Further, the absolute position of the vehicle may be determined by combination of a distance detected by distance sensor 133 and a direction detected by terrestrial magnetism sensor 132 and/or gyro-magnetic sensor 136, or by combination of a distance detected by distance sensor 133 and a steering angle detected by steering sensor 134.

Communication unit 15 transmits and receives data to and from FM transmission units and telephone circuits. For example, it receives data regarding road information including traffic jams and traffic accident information supplied from a traffic information center.

Input unit 16 is used to input any data for, for example, correction of the current position at the beginning of driving and for input of the destination. An example of input unit 16 is a touch panel arranged on a display unit 17 and adapted to input any information by touch of a key or menu represented thereon. Another example of input unit 16 is a keyboard, a mouse, a bar code reader, a write pen or a remote controllable input device. Input means 16 constitutes the destination setting means of the present invention.

Display unit 17 is used to represent, for example, guidance for vehicle operation, operation menus, operation keys, a recommended travel route to the destination determined responsive to a user's request, and a guide map of the area along the travel route. As display unit 17 may be used a CRT display, a liquid crystal display, a plasma display or a hologram device that projects a hologram onto a front glass. Display unit 17 constitutes announcement means for providing visual information to the driver to let him or her know the contents of the transmission control.

Voice input unit 18 comprises a microphone, for example, through which necessary information can be input by a voice of an operator. Voice output unit 19 has a voice synthesizing device and a speaker, thereby outputting synthesized voice guidance information. In addition to the synthesized voice guidance information, various guidance information prerecorded on a tape may also be output through the speaker. The voice guidance information may be a combination of the synthesized voice and the prerecorded voice.

With the above-described arrangement, the navigation system operates to provide road information for the vicinity around the vehicle current position to the driver, thereby guiding the driver along a specific travel route to the destination. More particularly, when the destination is input through input device 16, the navigation processing unit 11 operates to selectively determine a recommended travel route to the destination, based on the vehicle current position detected by current position sensor 13 and the road information read out from data memory unit 12. The travel route is output to display unit 17. The travel route shown on display unit 17 cooperates with the voice information output through voice output unit 19 to guide the driver to the destination. When a destination is not input, navigation processing unit 11 outputs only the road information for the vicinity around the vehicle current position to display unit 17.

In the above-described navigation system 10, current position sensor 13 serves as the current position sensor means, and data memory unit 12 and navigation processing unit 11 in combination constitute the road information obtaining means. A specific point forward of the vehicle current position in the direction of driving is determined by navigation processing unit 11, based on the current position and the driving direction of the vehicle, both detected by current position sensor 13, and the road information stored in data memory unit 12. Specific point sensor means is constituted by current position sensor 13, data memory unit 12 and navigation processing unit 11. Distance calculating means is constituted by current position sensor 13, data memory unit 12 and navigation processing unit 11.

Drive route search means is constituted by input device 16, current position sensor 13, data memory unit 12 and navigation processing unit 11.

Figure 2:
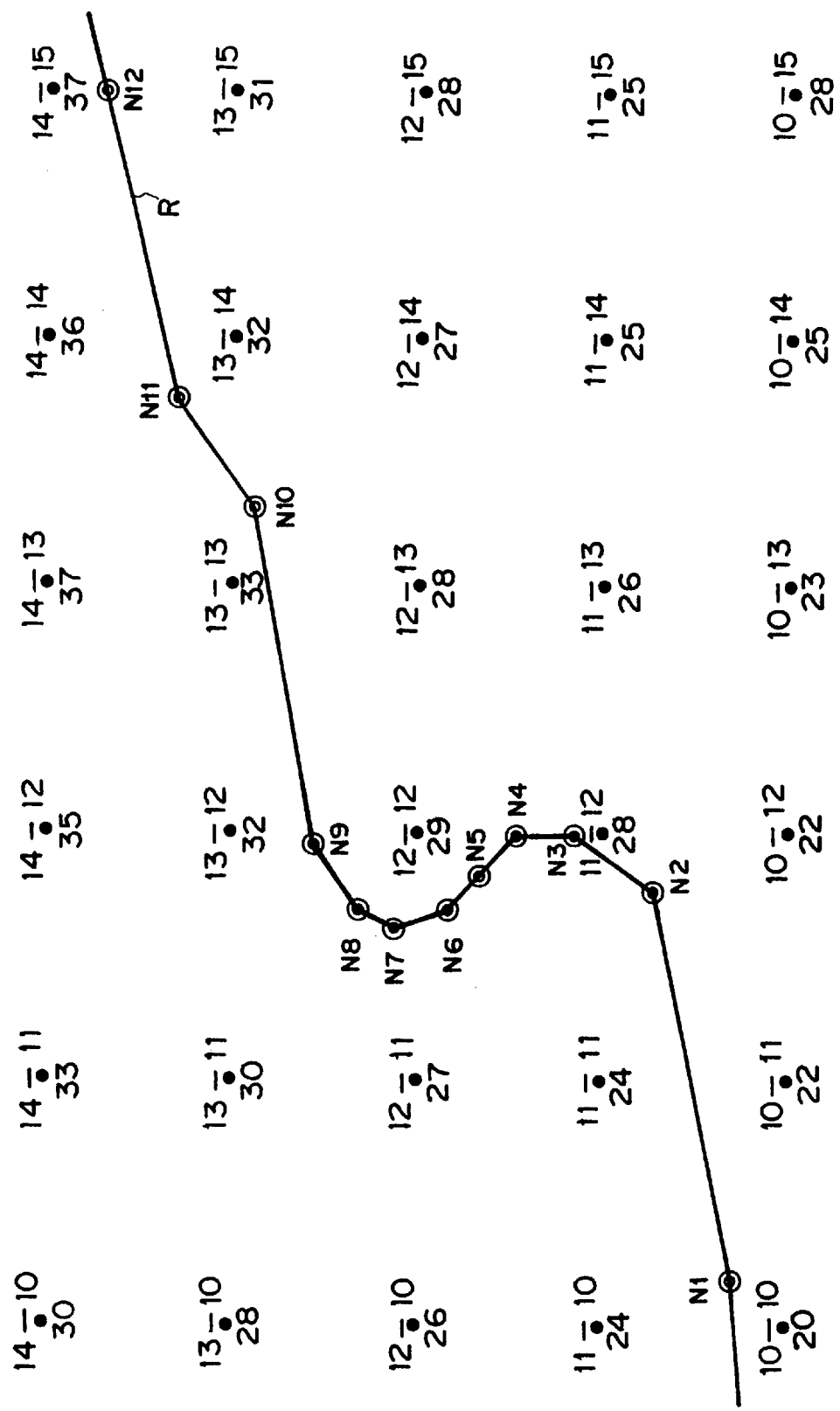
FIG. 2 is an explanatory diagram showing road data.

The road data stored in data memory unit 12 is composed of node-connecting segments. FIG. 2 is a diagram showing an example of the road data stored in data memory unit 12, wherein a solid line R shows the shape of the road. The road shape is represented by nodes (N1, N2, . . . ) and segments connecting adjacent nodes. Each node is defined at least by its coordinates (which in this embodiment are the absolute coordinates for latitude and longitude).

In this embodiment, the road shape is also defined by altitude, as well as by nodes and segments. Altitude data are given to points arranged at 250-meter spacings from each other in lateral and longitudinal directions. For example, a point 10-10 is at the altitude of 20 meters and another point 10-11 is 22 meters, as shown in FIG. 2.

In this embodiment, the average curvature, the road slope, the altitude variation, the radius of curvature, etc. are determined by relationship between the node positions and the altitude data for the respective nodes. Although the altitude data are given to spaced points as stated above to minimize the data volume, it may be possible that altitude data be provided for all of the respective nodes. It is also possible that gradient data be provided for each road section or segment and that the gradient data be used in combination with other data to determine the altitude of a specific node point.

The travel route may have been programmed into the navigation system. When no travel route has been programmed into the navigation system, the system assumes that the travel route extends straight ahead in the direction of driving.

The above-described navigation processing unit 11 determines an upper limit for shiftable transmission speeds in response to the respective road information, whereby a command signal indicating the upper limit transmission speed is output to the automatic transmission to be described later.

A/T mode select unit 20 is used to select a shift position and a transmission control mode. A/T mode select unit 20 constitutes the shift position sensor means of the present invention.

A vehicle condition (parameter) sensor 30 that detects various vehicle conditions, including the driving conditions, has vehicle speed sensor means or a vehicle speed sensor 31, decelerating operation sensor means comprising a brake sensor 32, an accelerator sensor 33, a blinker sensor 34, and a throttle opening sensor 35. Vehicle speed sensor 31 detects a vehicle speed V. Brake sensor 32 detects if a brake pedal is stepped on (ON/OFF). Accelerator sensor 33 detects the degree of accelerator opening $\alpha$. Blinker sensor 34 detects ON/OFF of a turn signal indicator switch. Throttle opening sensor 35 detects the degree of throttle opening $\theta$. Drive condition sensor means is constituted by vehicle speed sensor 31, and also by another sensor in A/T 41 that detects a current transmission speed. Accelerator sensor 33 also acts as announcement means.

When the system detects that some decelerating operation has begun, at least one of the corresponding brake indicating signal, accelerator opening degree indicating signal and turn indicating signal is supplied to navigation processing unit 11. The vehicle speed V detected by vehicle speed sensor 31 is supplied both to navigation processing unit 11 and to an electric control circuit 40 to be described later. The throttle opening degree detected by throttle opening sensor 35 is supplied to electric control circuit 40.

The beginning of a decelerating operation by the driver may be detected when the brake signal turns ON. It may also be possible to detect the degree of depression of the brake pedal, in which case a degree of deceleration, for example, a need for an emergency down-shift is inferred in further consideration of the detected degree of depression of the brake pedal. The beginning of a decelerating operation may also be detected as a change in the degree of accelerator opening. More particularly, when a very small degree of accelerator opening is further decreased by more than a predetermined percentage (that is a percentage decrease in the extent of depression of the accelerator pedal), the system determines that the driver has begun a decelerating operation. In summary, the driver's operation of greatly decreasing the extent of depression of the accelerator pedal is recognized as initiation of deceleration and, therefore, is detected as a decelerating operation.

A deceleration operation may also be indicated by variation (decrease) of the accelerator opening $\alpha$, variation (decrease) of vehicle speed, variation (decrease) of acceleration, etc. These parameters may be combined with the accelerator opening degree $\alpha$, after it is changed, to detect initiation of a decelerating operation. For example, when the vehicle is running only by inertia, the accelerator opening degree $\alpha$ is nearly zero. Accordingly, $\alpha \approx 0$ does not always mean that the driver has begun a decelerating operation. Thus, when there is a sufficient decrease in the accelerator opening and when the decreased accelerator opening becomes substantially zero, then it is affirmed that a decelerating operation has been initiated.

Beginning of the driver's decelerating operation may also be inferred by a change of throttle opening (that is engine torque). As has been described with regard to the case wherein the starting operation of deceleration is judged based on the degree of accelerator operation, a change in the degree of throttle opening (amount of decrease of the throttle opening, decrease of the vehicle velocity, or a decrease in deceleration) may be taken as a start of a decelerating operation.

In still another embodiment, beginning of the driver's decelerating operation is inferred based on operation or non-operation of the brake pedal and the accelerator pedal. By way of example, an inference that the driver has begun a decelerating operation is made when either one of depression of the brake pedal or release of the accelerator pedal is detected. Alternatively, an inference of the beginning of the driver's decelerating operation is made only when detecting both the braking operation and released state of the accelerator pedal. Thus, the control system faithfully follows the driver's intent to decelerate.

In still another embodiment, the beginning of the driver's decelerating operation is anticipated by an ON signal indicating the turn indicating light is now in operation. In this embodiment, it is preferable to further take into consideration the velocity when the blinker signal is ON. For example, if the vehicle speed still exceeds a predetermined speed at which the vehicle could safely enter a street crossing at the time when the turn indicating signal is activated (ON), it could be inferred that such operation of the turn indicating signal is an initial step in the driver's decelerating operation. If the vehicle speed has been lowered to below the predetermined speed at the time when the turn indicating signal is turned ON, it could be inferred that no decelerating operation is initiated.

Vehicle condition sensor unit 30 may include a light sensor that detects the turning on of headlamps, and a wiper sensor that detects operation of a windshield wiper. The light sensor may be incorporated into a switch operated to turn the headlamps ON and OFF and the wiper sensor may be incorporated into a switch for actuating the wiper. The headlamps being turned ON would suggest that it has become dark around the vehicle and, therefore, may be considered as one of factors inferring beginning of a driver's decelerating operation. The wiper in operation would suggest rainfall or snowfall which decreases the friction coefficient of the road surface and, therefore, may also be considered as a factor inferring beginning of or necessity for a decelerating operation.

In other words, turning-on of the headlamps and/or the wiper indicates a need for deceleration and could be followed by a positive decelerating operation by the driver (for example, stepping on the brake pedal and/or release of the accelerator pedal). Thus, consideration of these factors will facilitate the control efficiency in the present system. The above-described factors to be used to infer an initial step of a driver's decelerating operation will be referred to as an "event" in the following description.

The automatic transmission comprises a transmission mechanism 41 (referred to by A/T in the drawings) including a gear train composed in main of planetary gears and a hydraulic circuit for engagement and disengagement between components of the gear train to provide a multi-speed transmission, and an electric control circuit 40 (hereinafter referred to as "A/T ECU") for controlling the transmission mechanism unit 41.

Navigation system unit 10 and the A/T ECU 40 are connected with each other by communication lines. To A/T ECU 40 are connected the vehicle speed sensor 31 and the throttle opening sensor 35. A vehicle speed signal from sensor 31 and a throttle opening signal from sensor 35 are supplied to the A/T ECU 40. A shift position signal indicating the shift position selected by AT mode selecting unit 20 is supplied to A/T ECU 40 from a shift position sensor (not shown) mounted to transmission mechanism 41.

The A/T ECU 40 outputs a drive signal to an actuator (hydraulic solenoid) in the hydraulic circuit of mechanism unit 41, in response to which the actuator operates to control the transmission speed. The A/T ECU 40, in turn, is controlled by control programs stored in EEP-ROM 42. For example, the transmission speed is determined, in response to the degree of throttle opening detected by throttle opening sensor 35 and the vehicle speed detected by vehicle speed sensor 31, in reference to memory tables (transmission maps). The transmission maps selectively determine a specific one of the transmission speeds.

The transmission maps have been prepared separately for a normal mode and a sport mode, one of which is automatically selected in response to the transmission mode indicating signal supplied from navigation processing unit 11. The transmission mode may also be changed manually by the driver's operation of AT mode selecting unit 20.

The normal mode stores an economic drive pattern having a good balance of fuel consumption and power, which is suitably applicable to the normal driving conditions. Power is much importantly considered in the sport mode which is suitably applicable to driving in a mountain area or hill-climbing, for example.

In this embodiment, the transmission control determines an upper-limit for the transmission speeds, that is prohibits an upshift to speed(s) higher than the determined upper-limit speed, while not changing the usual transmission maps. Accordingly, any transmission map may be utilized for normal transmission control.

A shift lever provided in the AT mode selecting unit 20 has six selectable shift positions, that is, a parking position, a reverse position, a neutral position, a drive position, a second speed position and a low speed position. The shift lever is mechanically connected to the shift position sensor, not shown, mounted to the transmission mechanism 41.

When the shift lever is in the drive position, any one of 1st to 4th gear speeds in transmission can be selected. Either of the 1st and 2nd gear speeds is selectable in the second speed position. In the low speed position only 1st gear speed is applicable. In this embodiment, navigation system 10 performs the automatic transmission control operation when the shift lever is held at the drive position. When navigation system 11 commands that the upper limit for the transmission speeds is 3rd gear speed, the drive signal outputted therefrom ranges 1st to 3rd speeds, and is supplied to an actuator 42 that actually determines the gear ratio in response to the drive signal. For example, when A/T ECU 40 determines 4th gear speed but navigation system 11 commands that the transmission speed should be no higher than 3rd gear speed, a drive signal commanding 3rd gear speed is supplied.

The shift position and the transmission mode are also supplied via A/T ECU 40 to navigation processing unit 11.

In a modified embodiment, navigation processing unit 11 stores in advance transmission maps of A/T ECU 40, in which case navigation processing unit 11 determines an actual transmission speed within a restricted range, with reference to a transmission map, and the determined transmission speed is output to A/T ECU 40.

In response to the throttle opening signal from throttle opening sensor 35 engine speed and other engine conditions (coolant temperature, sensor signals, etc.), an engine control unit (referred to by E/G ECU in the drawings) 50 operates to control the engine 51 by regulating fuel injection, for example.

With the above-described arrangement, the transmission speed control is conducted based on the road information in the navigation system as follows.

First Embodiment

Figure 3:
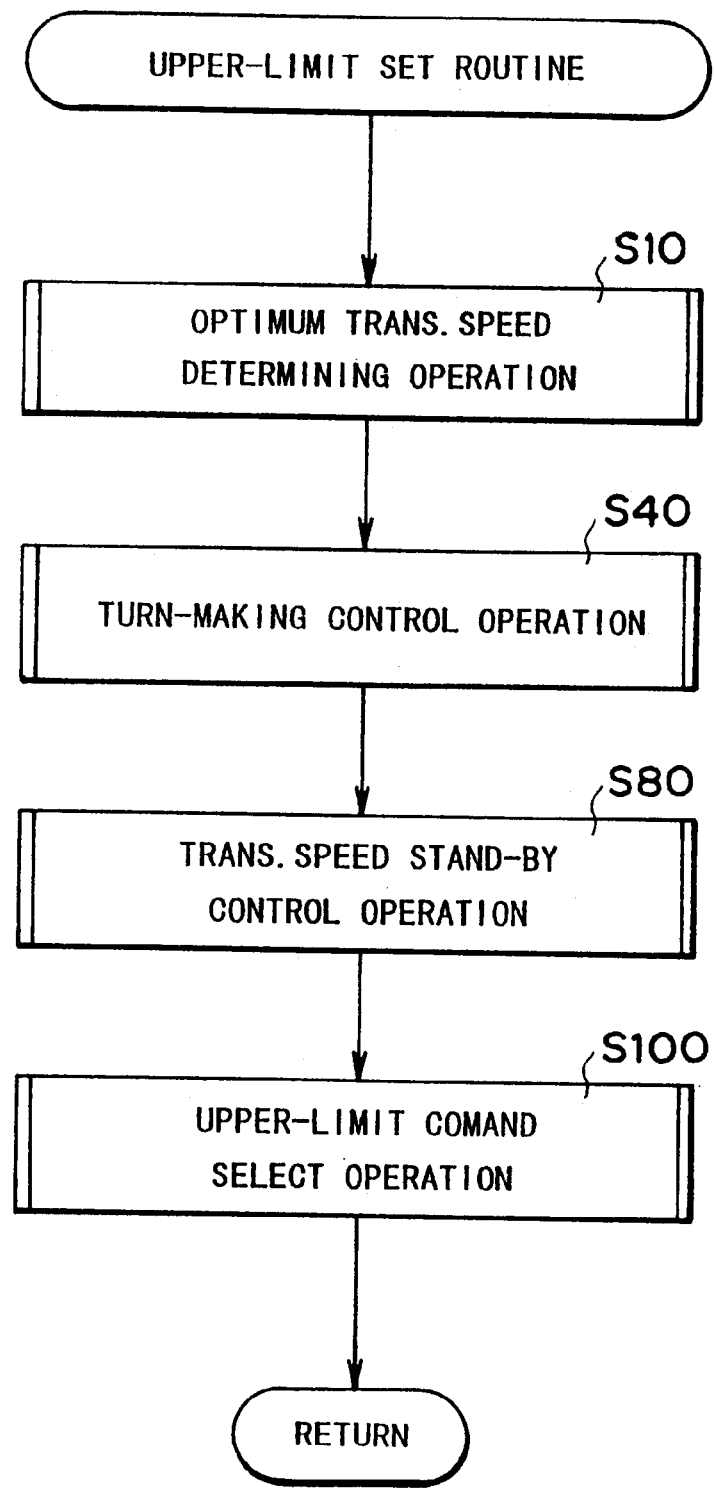
FIG. 3 is a flowchart of an upper-limit setting routine used in the first embodiment.
Figure 4:
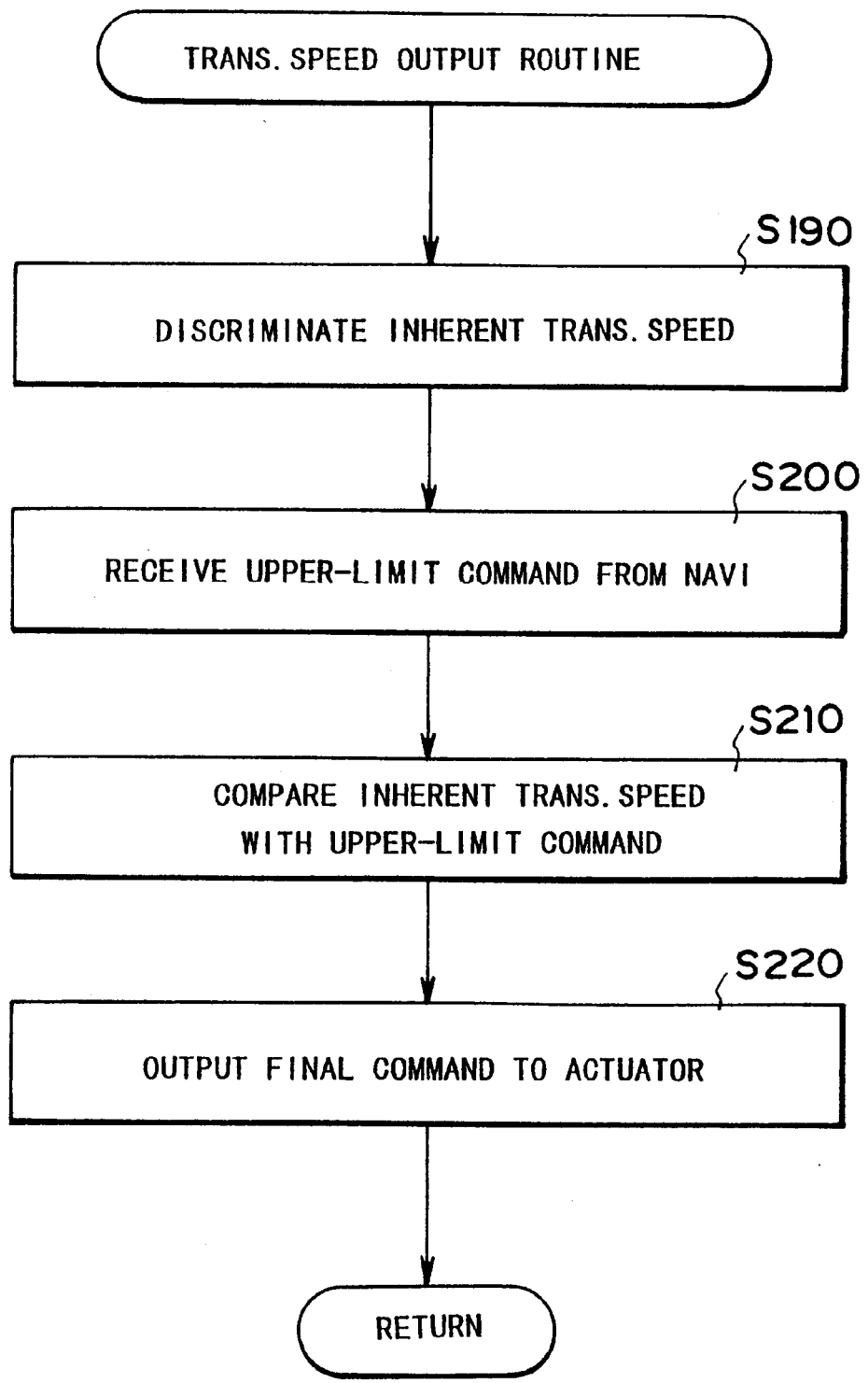
FIG. 4 is a flowchart of a transmission speed output routine used in the first embodiment.

The transmission speed control conducted by navigation processing unit 11 and A/T ECU 40 in this embodiment will be described with reference to the flowcharts of FIGS. 3–5, 8 and 9. FIG. 3 shows an upper-limit setting routine which is a part of operation of navigation processing unit 11. FIG. 4 shows a transmission speed output routine which is a part of operation of A/T ECU 40.

As shown in FIG. 3, the upper-limit setting routine comprises an optimum transmission speed determining sub-routine (S10), a turn-making control sub-routine (S40), a transmission speed stand-by sub-routine (S80) and an upper-limit command selecting sub-routine (S100).

As shown in FIG. 4, the transmission speed output routine comprises steps of determining an inherent transmission speed in accordance with a transmission map in EEP-ROM 42 (S190), receiving an upper-limit transmission speed command (i.e., a signal commanding a shiftable range of transmission speeds) from navigation processing unit 11 (S200), comparing the commanded upper limit with the determined inherent transmission speed to determine if the determined transmission speed is within the shiftable range (S210), and outputting a command signal to an A/T mechanical unit 60. S210 is operation of restriction means and comparison means.

The optimum transmission speed determining sub-routine (S10) will now be described with reference to the flowchart of FIG. 5.

Navigation processing unit 11 calculates road curvature of predetermined sections, each including a node, forward of the current position (S152), and determines a recommended vehicle speed V0 for each section, based on the calculated road curvature S154). This step S154 is operation of recommended vehicle speed determining means. There are many methods of calculating the road curvature and any one can be used here. For example, the road curvature of a section including a specific node may be calculated by an angle between two lines connecting the specific node and adjacent two nodes, respectively.

Figure 6:
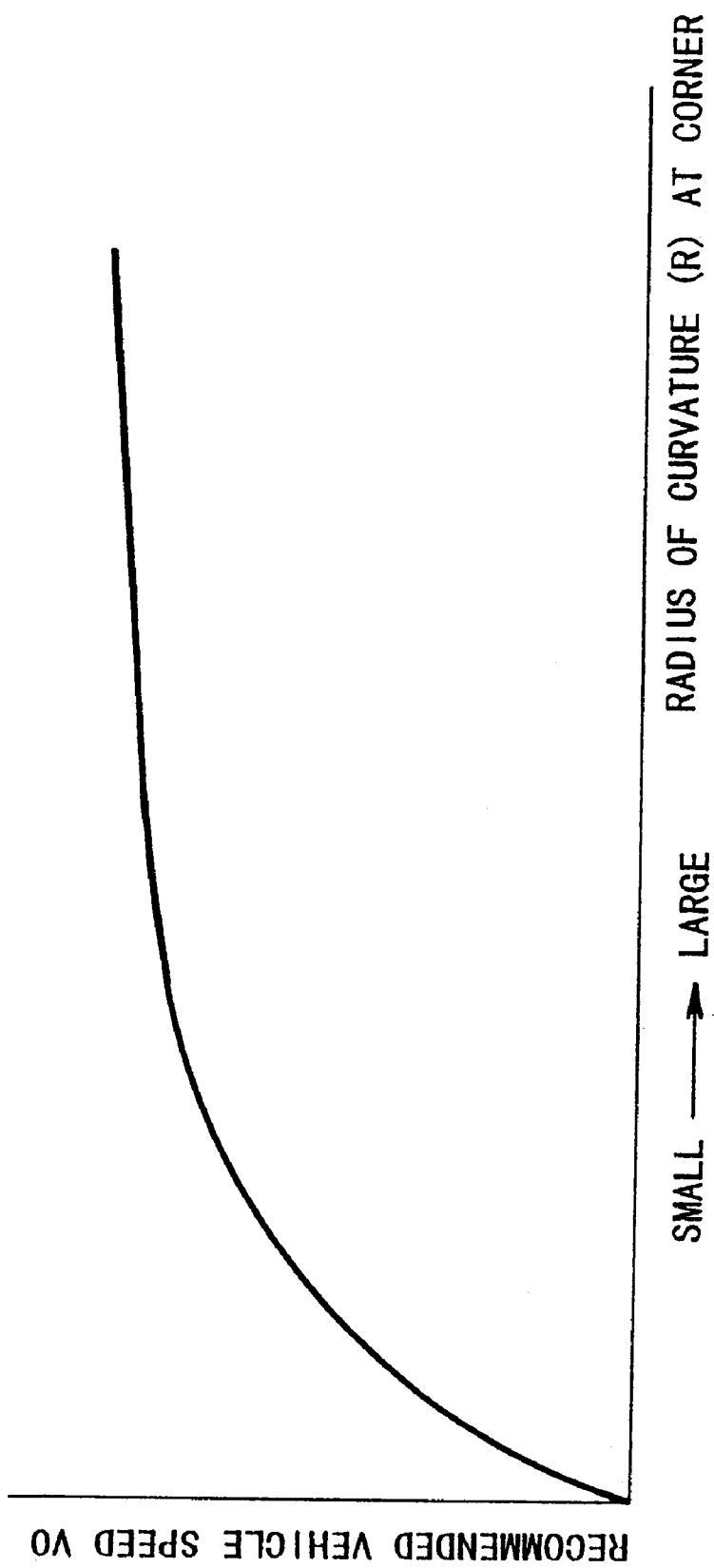
FIG. 6 is a map for use in determining a recommended vehicle speed.

Navigation processing unit 11 has a map for use in determination of recommended vehicle speed V0 as shown in FIG. 6. It thus determines a recommended vehicle speed V0 when the vehicle passes each of the respective node points.

In this map, the recommended vehicle speed V0 becomes lower as the road curvature is smaller, whereas it increases with the latter.

It calculates a road slope from the current position to a specific node position in the foregoing manner (S156), and then determines deceleration curves G2 and G3 (S158).

Figure 7:
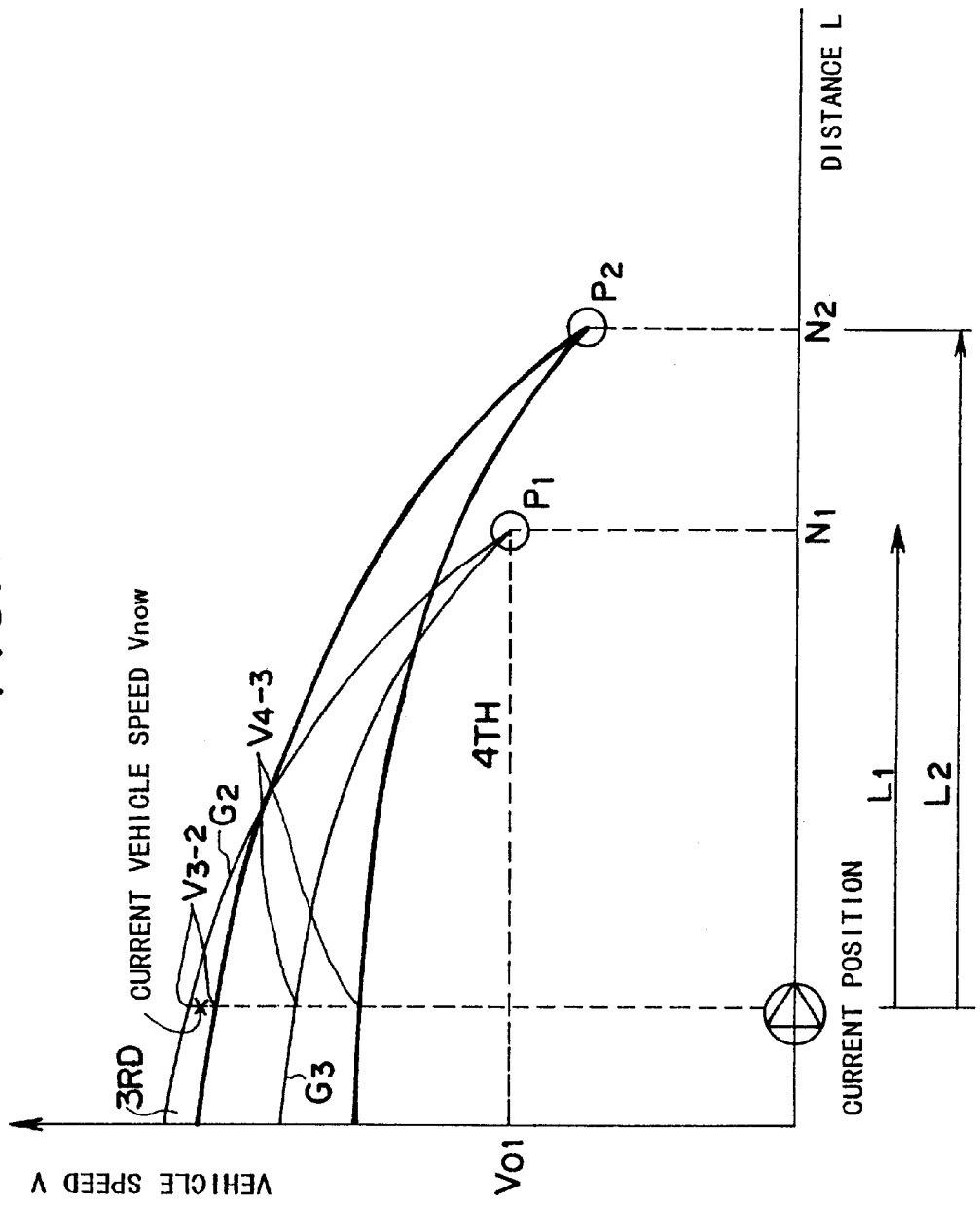
FIG. 7 is a map for use in determining an appropriate transmission speed.

FIG. 7 shows examples of deceleration curves G2 and G3 determined at S158. The transmission speeds should preferably below 3rd when a degree of deceleration is plotted above a deceleration curve G3. The transmission speeds should preferably below 2nd when a degree of deceleration is above the deceleration curve G2. This is because a lower transmission ratio contributes stability and braking efficiency as the vehicle slows down.

In this embodiment, a degree of deceleration is determined by taking road slope into consideration. This is because driving on a level road and on an uphill or downhill require different degrees of deceleration to achieve the same actual effect of slow-down. When a driver intends to slow down while driving on an uphill grade, in some cases, a sufficient degree of deceleration can be automatically obtained with no downshift operation.

A plurality of deceleration curves G3, G2 may be prepared for different road slopes. It is also possible to revise one deceleration curve G3, G2, prepared for a flat road, in accordance with road slope data. Data of G3 and G2 may also be revised in accordance with the weight of the vehicle which varies with the number of passengers. The vehicle weight may be calculated based on deceleration with a specific output shaft torque.

Next, navigation processing unit 11 detects a distance L of a section from the current position to a specific node point (N1, N2 in FIG. 7 which the vehicle should go through at a recommended vehicle speed V0), at S160. This step S160 is operation of distance calculating means.

It then calculates a vehicle speed V4-3 from the recommended vehicle speed V0, the sectional distance L and the deceleration curve G3. The vehicle speed V4-3 represents a standard vehicle speed from which the vehicle may decelerate to the recommended vehicle speed V0 by deceleration through the curve G3 over the distance L.

Likewise, it calculates a vehicle speed V3-2 from the recommended vehicle speed V0, the sectional distance L and the deceleration curve G2. The vehicle speed V3-2 represents another standard vehicle speed from which the vehicle may decelerate to the recommended vehicle speed V0 by deceleration through the curve G2 over the distance L.

It then determines if the vehicle speed V4-3 is equal to or lower than the current vehicle speed Vnow (S166). If the vehicle speed V4-3 is equal to or lower than the current vehicle speed Vnow, it means that a greater degree of deceleration than the deceleration curve G3 is required to decelerate the vehicle from the current speed to the recommended speed within a distance L. On the other hand, if the vehicle speed V4-3 exceeds the current vehicle speed Vnow (NO at S166), it means that no special transmission speed control is necessary. In this embodiment, since the automatic transmission is a 4-speed transmission, the optimum transmission speed is determined as 4th (S174) and the routine is returned to the beginning.

The vehicle speeds V4-3, V3-2 are standard vehicle speeds and step S166 is operation of standard vehicle speed calculating means.

When the vehicle speed V4-3 is equal to or smaller than the current vehicle speed Vnow (YES at S166), then the system determines if the vehicle speed V3-2 is equal to or lower than the current vehicle speed Vnow (S168).

When the vehicle speed V4-3 is equal to or lower than the current vehicle speed Vnow and the vehicle speed V3-2 is larger than the current vehicle speed Vnow (as in the case of an example plotted in FIG. 7), 3rd speed is determined as an optimum vehicle speed (S172), and the routine is returned to the beginning. This is the case where the transmission speed should not exceed 3rd speed, but severe deceleration is not required.

When the vehicle speeds V4-3 and V3-2 are both equal to or lower than the current vehicle speed Vnow, 2nd speed is determined as an optimum vehicle speed (S170), and the routine is returned to the beginning. This is the case where the transmission speed should not exceed 2nd speed. This step is applicable when the vehicle should decelerate to below the recommended vehicle speed at the node point N2.

Figure 5:
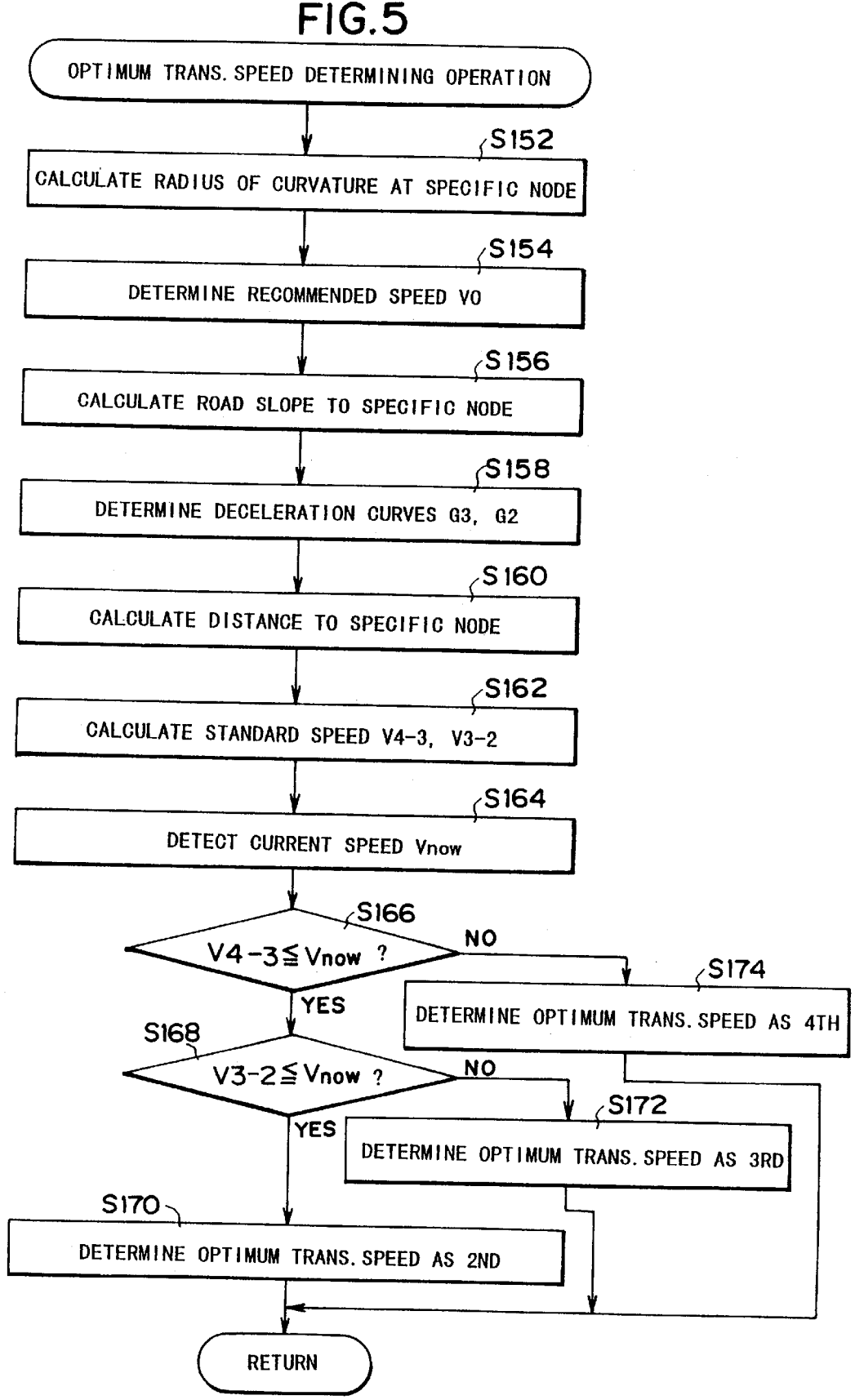
FIG. 5 is a flowchart of an appropriate transmission speed determining sub-routine used in the first embodiment.

The flowchart of FIG. 5 is a routine for operation of the optimum transmission speed determining means.

The turn-making control operation (S40) at a curve or corner will be described with reference to the sub-routine shown in FIG. 8.

Figure 8:
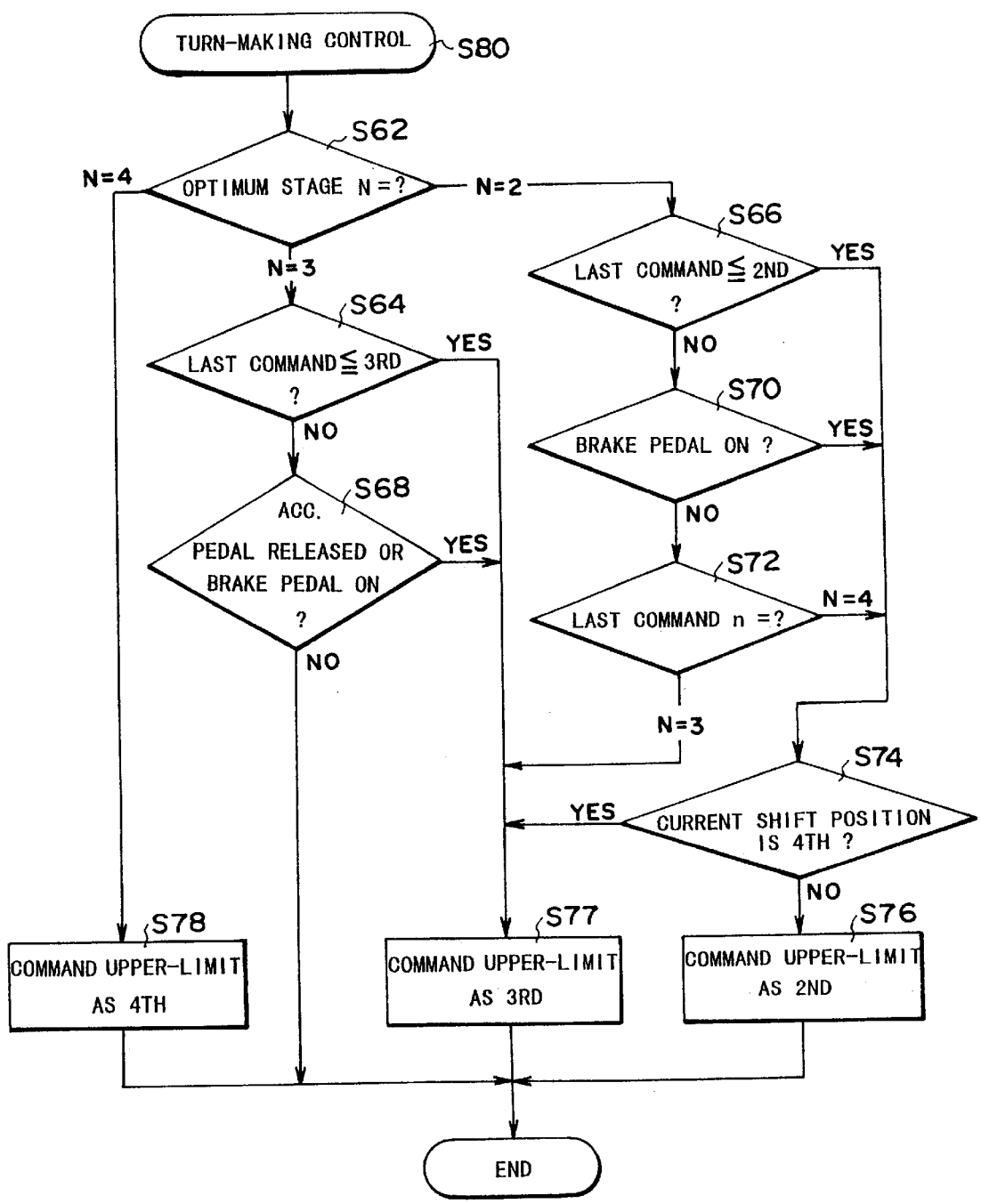
FIG. 8 is a flowchart of a turn-making control sub-routine used in the first embodiment.

At step S62 in FIG. 8, navigation processing unit 11 confirms the optimum transmission speed which has been determined by the preceding execution. When 4th speed has been selected, it outputs to A/T ECU 40 a command that the upper limit of the transmission speeds should be 4th (S78), and the procedure terminates. When 3rd speed has been selected, the procedure is advanced to a step S64 where it determines if the last execution of the control routine has determined an upper limit command (hereinlater referred to as "last command") designating 3rd or lower transmission speed. When the last command has designated 4th (NO at S64), it then determines if the accelerator pedal is released or the brake pedal is depressed (S68). Unless such operation is actually carried out (NO at S68), the procedure terminates so that the last command designating 4th is maintained. On the other hand, when the accelerator pedal is released or the brake pedal is stepped on (depressed) (YES at S68), it supplies a command that the upper limit should be 3rd (S77). When the last command designated 3rd or lower (YES at S64), with no further determination, a command issues setting the upper limit at 3rd (S77).

As described above, in this embodiment, a downshift control operation is carried out only when some "event" happens. Of course it is possible that downshift control from 4th to 3rd is made immediately after it is confirmed at S62 that the optimum shift position is 3rd. Such control, however, would result in a sudden downshift without any notice to the driver. To obviate this problem, the control of this embodiment requires some "event", that is, release of the accelerator pedal or active operation of the brake pedal, which may be regarded as a driver's positive intention of deceleration, in response to which a command of downshift from 4th to 3rd is supplied.

When the optimum shift position N is 2nd, which is confirmed at S62, the control procedure is advanced to a step S66 where it is determined if the last command designated 2nd or lower. When the last command designated 3rd or 4th (NO at S66), it is then determined if the brake pedal is engaged (at S70). If the brake is not in operation (NO at S70), it is determined which transmission speed (n) was designated by the last command (at S72). When the last commanded transmission speed (n) is 3rd, the routine advances to step S77 so that the same upper limit transmission speed (3rd) is maintained.

When the brake pedal is engaged (YES at S70), it is determined if the current shift position is 4th (at S74). When the current shift position is 4th (YES at S74), the routine advances to step S77 where it is so controlled that the upper limit of shiftable transmission speeds should be 3rd. When the current speed is not 4th but 3rd (NO at S74), the routine advances to step S76 where the upper limit of shiftable transmission speed is 2nd. When it is. determined at S66 that the last command designated 2nd (YES at S66), or when it is determined at S72 that the last command designated 2nd, the procedure is advanced, through the determination at S74, to step S76 where the same upper limit (2nd) is maintained.

In the above control, it is determined if the last command transmission speed is 3rd at S72, and it is determined if the current shift position is 4th at S74. The control including such discriminations achieves smooth deceleration because 4th is shifted down to 3rd and then to 2nd, which prevents sensation of an excessive degree of engine braking. Moreover, in this embodiment, the downshift to 3rd is allowed (at S77) only when there is a release of the accelerator pedal or active operation of the brake pedal (YES at S68), and thereafter, the further downshift to 2nd is allowed (at S76) only when there is an active operation of the brake pedal (YES at S70). This means that the downshift to 2nd, which provides a strong engine brake, is achieved only upon confirming a driver's definite intention to decelerate. The flowchart of FIG. 8 depicts operation of the primary upper-limit determining means and the first restriction means.

The upper limit command designating 2nd or 3rd is not directly supplied to A/T ECU 40, but is compared with another control command to select that one designating the minimum transmission speed (i.e., a transmission speed having the highest gear ratio) in the upper-limit designating routine executed by navigation processing unit 11.

Next, the transmission stand-by process (Step 80) of FIG. 9 will be described.

This process is in operation when it is inferred that the upper-limit control is not necessary when some event occurs and there is no fresh event.

For example, let us imagine that the vehicle goes through a turn or a curve. When the accelerator pedal is released at a point far ahead of the turn so that the vehicle enters the turn at a low speed, since there is no occurrence of any event in a predetermined control zone, the downshift control is not carried out in the above-described control routine. In this case, A/T ECU 40 controls the transmission speed in accordance with the normal transmission pattern. However, in the normal transmission control by A/T ECU 40, a downshift from 4th to 3rd is carried out at a vehicle speed much lower than that of an upshift from 3rd to 4th which is carried out after passing through the turn. This provides a smooth downshift feeling to the driver, but tends to delay the downshift timing so that sufficient acceleration can not be obtained during and after turning. To cope with this problem, this embodiment utilizes a transmission stand-by process that controls a downshift at an appropriate timing, when the vehicle enters the turn, even if no event (release of the accelerator pedal) has happened within the control zone.

Figure 9:
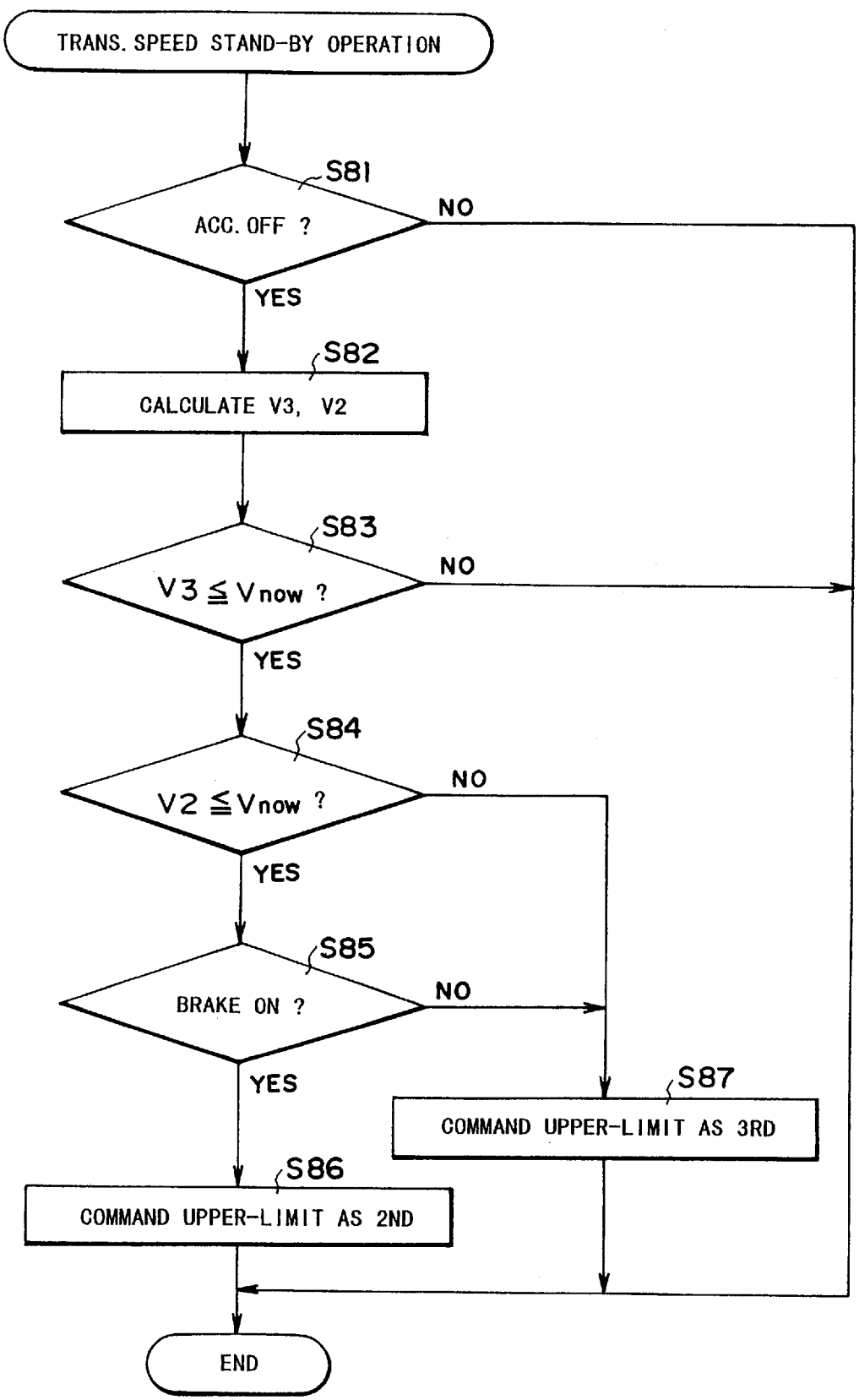
FIG. 9 is a flowchart of a transmission speed stand-by control sub-routine of the first embodiment.

The transmission stand-by control will be described with reference to the flowchart of FIG. 9 showing a sub-routine therefor.

First, navigation processing unit 11 determines if the accelerator pedal remains inoperative (at S81). When the accelerator pedal is engaged by the driver (NO at S81), which means that the driver has a positive intention to accelerate, the process ends. In this case, if the driver changes his or her mind to slow down the vehicle by releasing the accelerator pedal or by actuating the brake pedal, the downshift control is carried out by the above-described transmission speed command control process.

When the accelerator pedal remains disengaged (YES at S81), stand-by vehicle speeds V3 and V2 are calculated (at S82). The stand-by vehicle speed V3 should be determined as one higher than a 4th-to-3rd downshift point in the normal transmission control when the accelerator opening degree is almost zero. Likewise, the stand-by speed V2 is determined as one higher than a 3rd-to-2nd downshift point in the normal transmission control when the accelerator opening degree is almost zero. This enables downshift control to be executed at an earlier time than in the normal transmission control. Moreover, in this embodiment, the stand-by vehicle speeds V2 and V3 are determined to be higher than 2nd-to-3rd and 3rd-to-4th upshift points, respectively, in the normal transmission control when the accelerator opening degree is on the order of tens of percentages. This should prevent an undesirable upshift and maintain a lower transmission stage for a longer period of time than in the normal transmission control during driving around a turn. When the vehicle speed has increased to the stand-by vehicle speed V3, it is determined that the vehicle has passed through the predetermined control section extending between before and after the turn.

Then, it is determined if the current vehicle speed is higher than the stand-by vehicle speed V3 (at S83). When the current vehicle speed is lower than the stand-by vehicle speed V3 (NO at S83), the transmission stand-by process terminates.

When the current vehicle speed becomes equal to or higher than the stand-by vehicle speed V3 (YES at S83), which infers that a downshift to 3rd is recommended immediately, after the determination of step S84, the procedure is advanced to step S87 where an upper-limit command designating 3rd is issued, then terminates.

At S84, it is determined if the current vehicle speed is higher than the stand-by vehicle speed V2. When the current vehicle speed is lower than the stand-by vehicle speed V2 (NO at S84), which infers that 3rd should be maintained, the procedure is advanced to S87 where an upper-limit command designating 3rd is generated. When the current vehicle speed becomes equal to or higher than the stand-by vehicle speed V2 (YES at S84), which infers that a downshift to 2nd is recommended immediately, it is then determined if the brake pedal is engaged (at S85). If the brake pedal is engaged (YES at S85), an upper-limit command designating 2nd is generated (at S86), and the procedure terminates. In this process, the downshift control to 2nd is carried out only when the driver operates the brake pedal, which is confirmation of the driver's definite intention to decelerate. The flowchart of FIG. 9 depicts operation of the secondary upper-limit determining means and the second restriction means.

Figure 10:
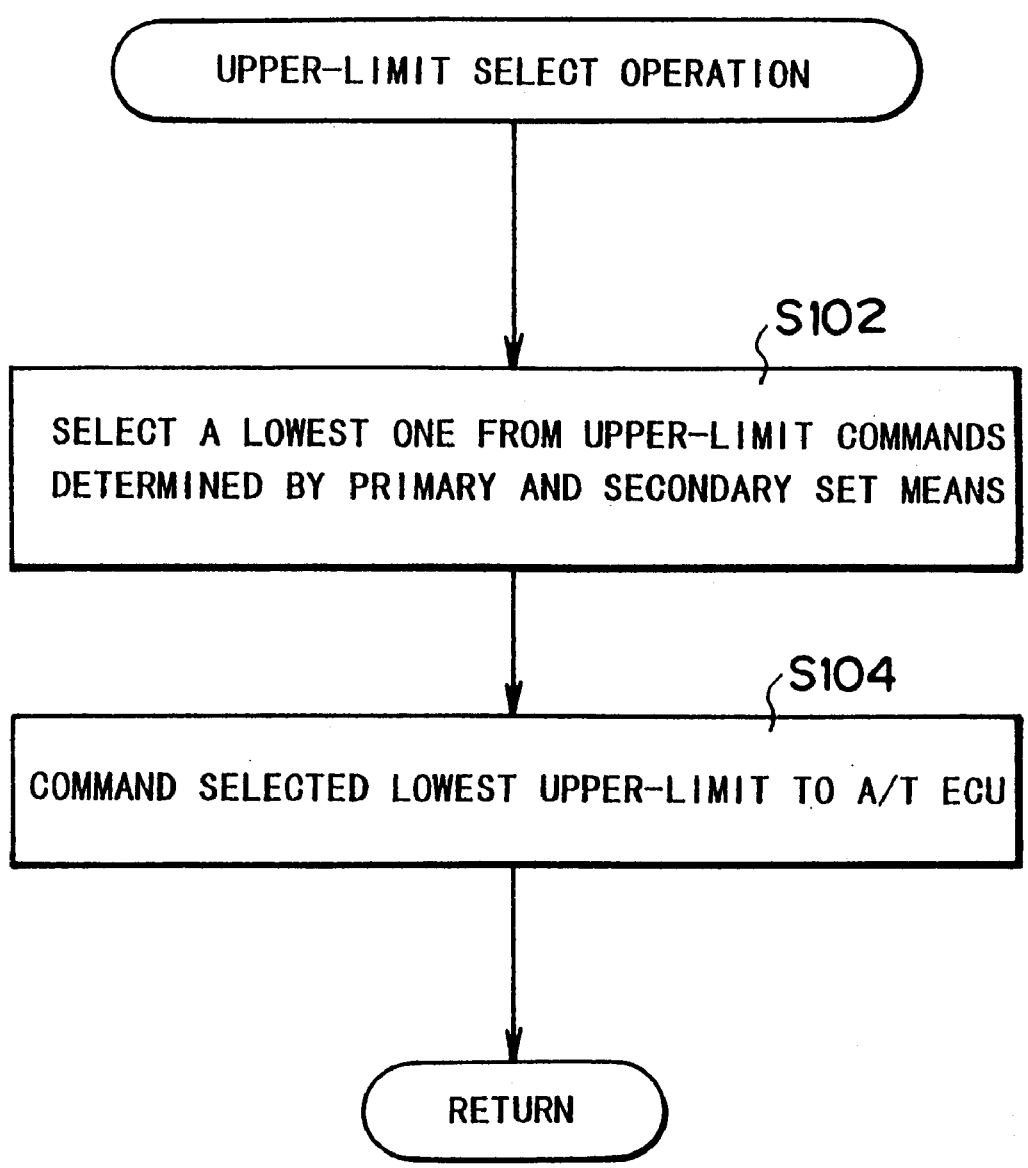
FIG. 10 is a flowchart of an upper-limit command selecting sub-routine of the first embodiment.

FIG. 10 shows the upper-limit command select process (Step 100).

More particularly, the turn-making control routine of S40 and the transmission speed stand-by control routine of S80 may determine different commands designating different upper-limit transmission speeds. In this case, that command designating the lower of the speeds is selected by navigation processing unit 11 (at S102). The operation at S102 is a function of the upper-limit determining means.

For example, when the turn-making control routine (S40) determines a 3rd-designating command and the transmission speed stand-by control routine (S80) determines a 2nd-designating command, a command designating the lower speed, that is the 2nd-designating command, is finally selected as the actual upper-limit command. This upper-limit command determined at S102 is supplied to A/T ECU 40 (at S104). The operation at S104 is a function of the command means. A/T ECU 40 receives the upper-limit command at the above-described step S200.

In this embodiment, the accelerator pedal and the brake pedal constitute means for detecting initiation of the driver's decelerating operation. Alternatively, such detection means may comprise a steering sensor that detects rotation or equivalent motion of a steering element, a sensor that detects operation of a turn indicating signal, or a sensor that detects a driver's operation from his or her eyes or brain waves.

In this embodiment, a direct downshift from 4th to 2nd is prohibited, irrespective of the optimum transmission speed determined by the control routine. This provides smooth deceleration. A downshift to 2nd is carried out in response to the driver's operation of stepping on the brake pedal, by which the driver's definite intention of deceleration is confirmed. Similarly, a downshift to 3rd is carried out in response to a release of the accelerator pedal, which is believed to represent the driver's intention of deceleration. When the driver releases the accelerator pedal, he or she does not want to speed up at that time. Accordingly, the driver would have no uncomfortable feeling when the transmission is automatically controlled to be downshifted, following his or her own operation of releasing the accelerator pedal.

Navigation processing unit 11 and A/T ECU 40 communicate with each other to achieve the control of this embodiment. However, all of the control operations may be executed by one of the two units. When both contribute to the control, any part or role may be assigned thereto. For example, the navigation processing unit 11 executes a routine that determines the optimum transmission speed based on the road data (that is the optimum transmission determining control routine in this embodiment), and the A/T ECU 40 executes another routine that outputs a command regarding a selectable transmission range in response to a change of status of the accelerator pedal or the brake pedal (that is the turn-making control routine in this embodiment). In this case, it is not necessary that signals from the accelerator sensor and the brake sensor are supplied to A/T ECU 40, as in the foregoing embodiment.

In accordance with this embodiment, even when there is no event, appropriate transmission control may be provided in conformity with the road contour. For example, where the vehicle enters a control zone that starts at a predetermined point prior to a curve with the accelerator pedal already released, even if no new event occurs, in other words, even if the brake pedal is not engaged, the upper-limit transmission control is carried out in response to the vehicle speed, when driving at a lower transmission speed is to be recommended. In this embodiment, a subjective control that reflects the driver's intention and an objective control that reflects driving and road conditions are well balanced with each other.

As described above, this invention has the primary upper-limit determining means that operates in response to the driver's own operation and the secondary upper-limit determining means that operates in response to the detected vehicle speed and the vehicle condition. Therefore, it is possible to provide a good balance between a subjective control that reflects the driver's intention and an objective control that reflects driving, road and vehicle conditions.

Second Embodiment

The control operation by a navigation processing unit 11 and A/T ECU 40 in accordance with this embodiment will be described. In this embodiment, the transmission control operation begins when the vehicle reaches a point a predetermined distance ahead of a curve. More particularly, when the driver releases the accelerator pedal to decrease the throttle opening, the normal transmission control commands an upshift, but in accordance with the control in this embodiment, the transmission is automatically shifted down to increase engine braking, thereby lowering the vehicle speed and achieving smooth travel in the turn.

When the vehicle is running on an uphill grade, a downshift provides a greater engine brake to efficiently reduce the vehicle speed, so that the control operation does not begin until the vehicle reaches the vicinity of the curve. On the contrary, when the vehicle is running on a downhill grade, a downshift provides a smaller engine brake and insufficient vehicle speed reduction, so that the control operation begins when the vehicle reaches a forward point relatively far in advance of the curve.

Figure 11:
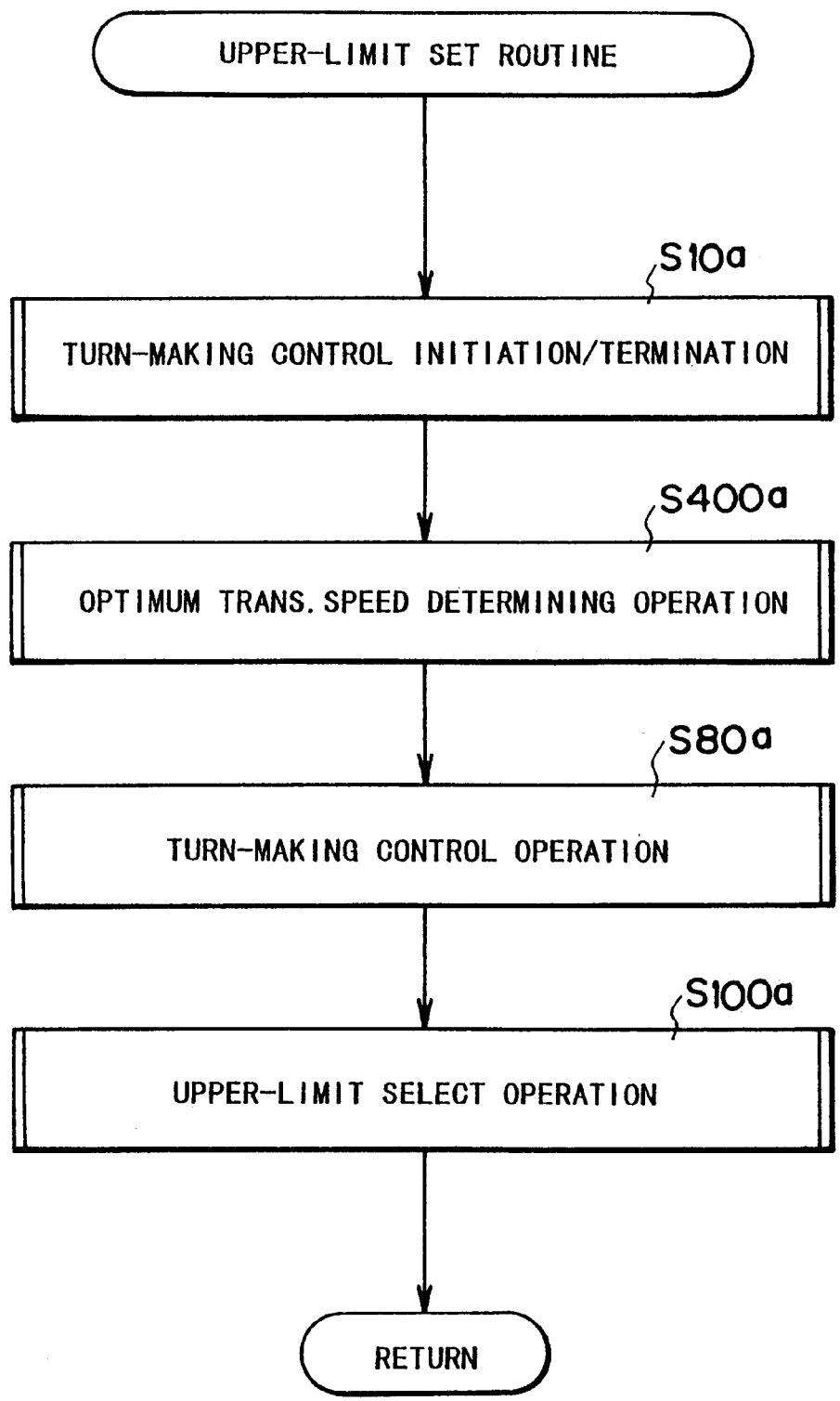
FIG. 11 is a flowchart of an upper-limit determining routine of a second embodiment.
Figure 12:
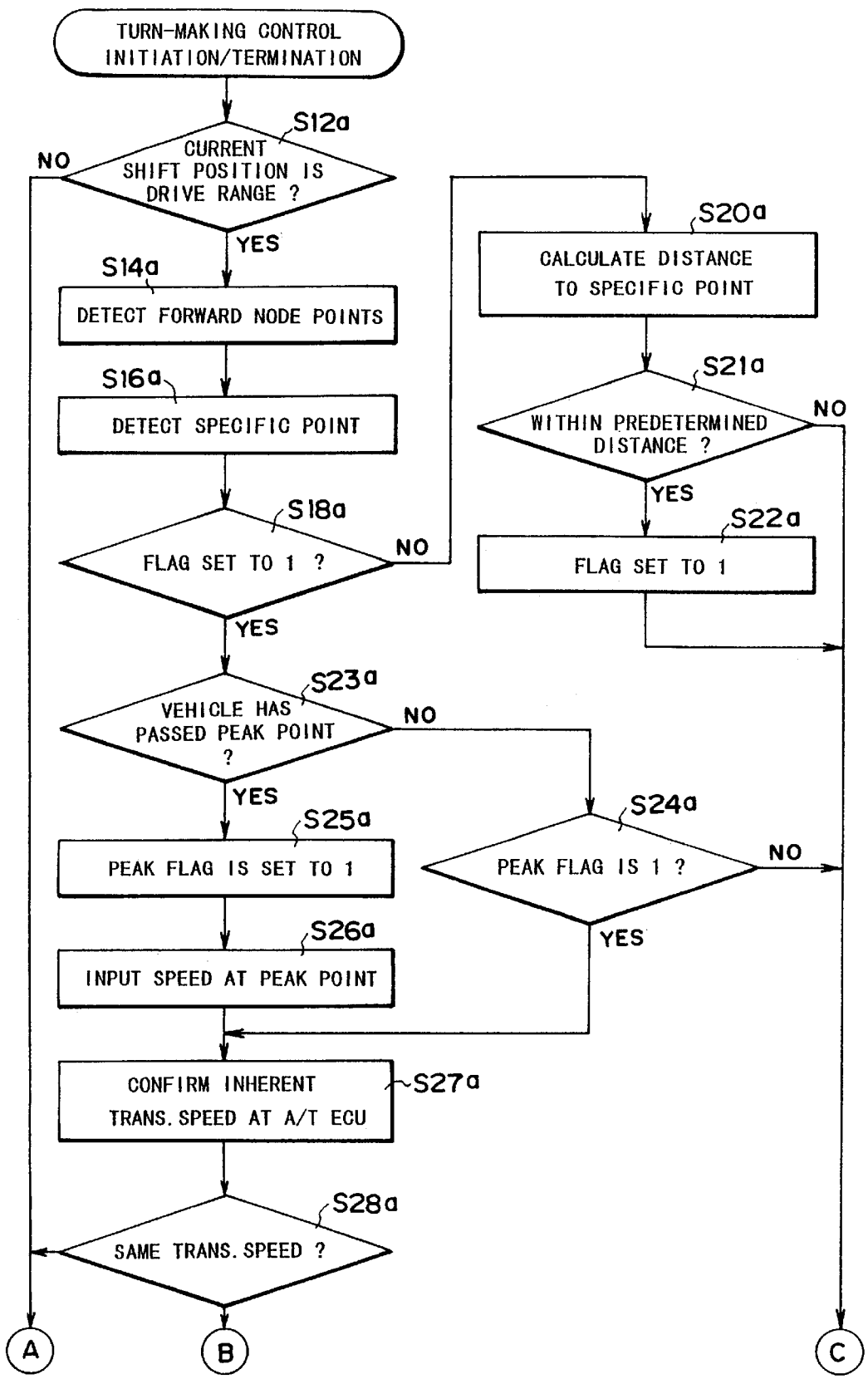
FIGS. 12 and 13 are a flowchart of a turn-making control command/release routine used in the second embodiment.
Figure 13:
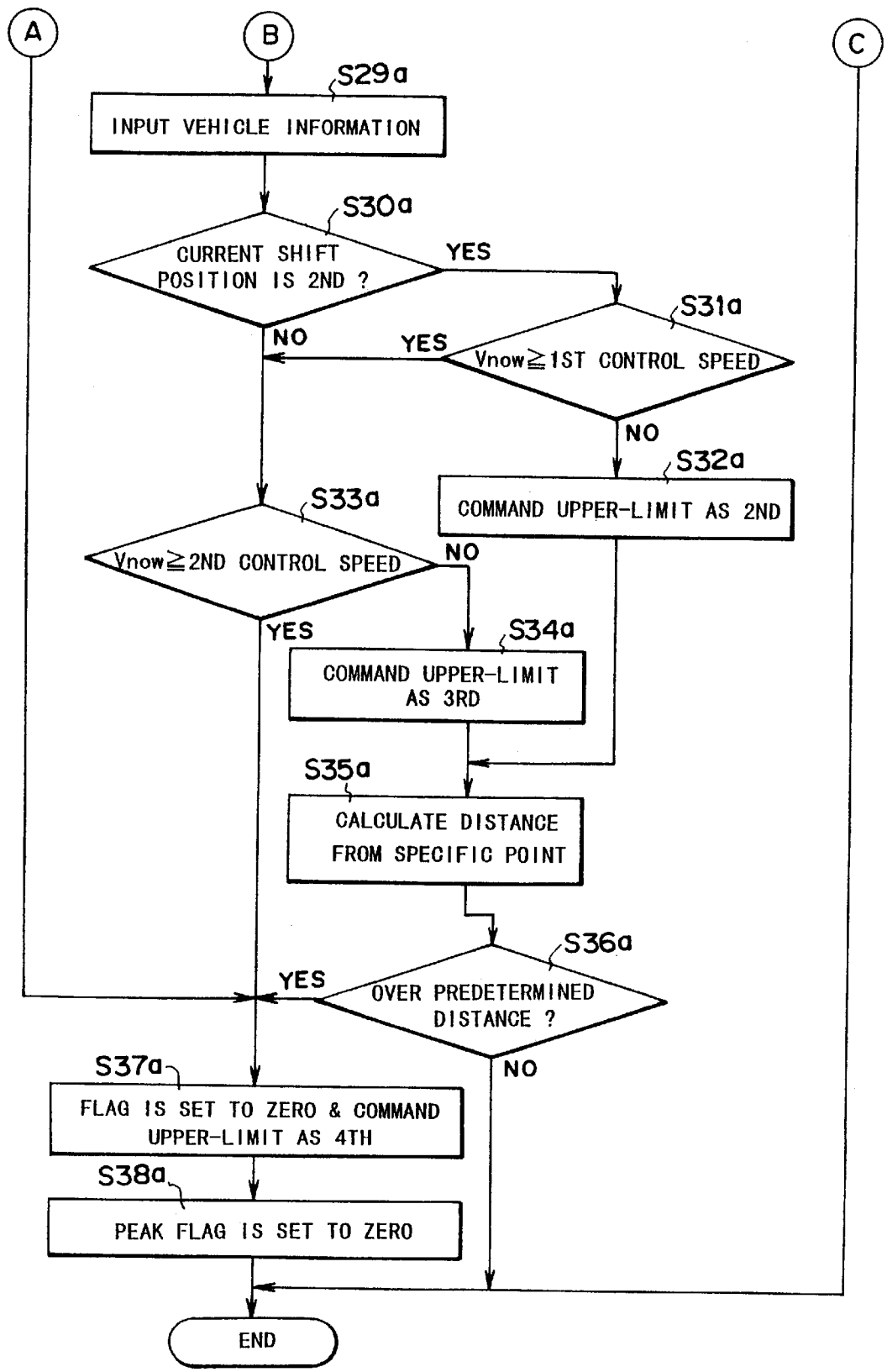

The control operation in this embodiment will be described with reference to FIGS. 11–13 showing flowcharts thereof. As shown in FIG. 11, the upper-limit determining routine includes a turn-making control initiation/termination discriminating sub-routine (S10a), an optimum transmission speed determining sub-routine (S400a), a turn-making control sub-routine (S80a) and an upper-limit command selecting sub-routine (S100a).

More particularly, navigation processing unit 11 first determines if the vehicle enters or leaves a predetermined control zone (at S10a). It then determines a primary upper-limit transmission speed (at S400a), determines a secondary upper-limit transmission speed in response to some event, e.g., release of the accelerator pedal or stepping-on of the brake pedal (at S80a), and compares the primary and secondary upper-limit transmission speeds determined at S10a and S80a, respectively, to select the lower one, which is supplied to A/T ECU 40 (at S100a).

A/T ECU 40 determines the control transmission speed from comparison between the upper-limit transmission speed supplied from navigation processing unit 11 and a transmission speed which is selected in accordance with the transmission map in accordance with normal transmission control. A command designating the control transmission speed is supplied to an actuator for actually executing a shift-change of A/T 41. Such control operation is substantially the same as that of the first embodiment, which has been described with reference to the flowchart of FIG. 4.

FIGS. 12 and 13 illustrate a flowchart of the control initiation/termination discriminating sub-routine (S10a). This sub-routine is provided for the following reason.

When the control of this embodiment is in operation, it executes a shift change in a manner opposite to the shift change made in the normal transmission control. More particularly, during the normal driving, when the accelerator pedal is released to decrease the throttle opening, the transmission will be automatically up-shifted. In contrast, in accordance with the control of this embodiment, a release of the accelerator pedal, and thus a decrease of the throttle opening, will result in a downshift.

Should the normal transmission control still be operative when the vehicle is travelling in a turn, the transmission would be downshifted in response to a release of the accelerator pedal in the foregoing manner, but thereafter soon downshifted by the normal transmission control. Thus, upshift and downshift would be repeated many times while driving through the turn. No drive energy is transmitted at the time of shift change. Further, a great amount of drive energy is required to run through the turn, but can not be obtained when the transmission has been upshifted to a higher shift position.

Considering the above facts, this embodiment provides the control initiation/termination discriminating sub-routine that determines if the vehicle enters or leaves the control zone including the turn. When the vehicle is within the control zone, an upshift of the transmission is prohibited.

Specifically referring to the flowchart of FIGS. 12 and 13, navigation processing unit 11 first determines if the current shift position is a drive range position (at S12a). If the current shift position is the second or low range position (NO at S12a), a flag for this control is set to zero (at S37a) and then the procedure is over.

When the current shift position is a drive range (YES at S12a), navigation processing unit 11 receives signals from an artificial satellite, through an antenna, using a GPS (Global Positioning System) to calculate the current vehicle position. It also reads out the road data from data memory 12a to recognize the current position on a map, and detects node points in the predetermined range that have been described with reference to FIG. 3 (at S14a). From the detected node points, it further determines if there is a turn on the scheduled travel route, and if there is a turn, detects a specific node point which is located at a peak of the turn (at S16a). By way of example, when there are three serial node points, and an angle of 170° or smaller is defined between a first segment connecting first and second node points and a second segment connecting second and third node points, it is inferred that there is a turn. The "specific node point" is that defining the greatest angle between preceding and succeeding node-connecting segments among those constituting the turn. There may be plural specific node points in one turn. Step S16a is operation of the turn detection means.

It is then determined if the flag has been set to one (at S18a). When the flag is still zero (NO at S18a), which means that the turn-making control has not yet been initiated, it calculates a distance from the current position to the specific position (at S20a), and determines if the current position has already entered a predetermined control zone (which begins at 500m ahead of the turn, for example), at S21a. When the vehicle is within the control zone (YES at S21a), the flag is set to zero (at S22a), and then the procedure is terminated. When the vehicle is still before the control zone (NO at S21a), the procedure is terminated, in which case the flag remains nullified.

In this embodiment, a predetermined distance used in the determination of S21a is a fixed distance. In a modification, it may be changed depending on the radius of curvature and/or a slope of the road from the current position to the turn. By way of example, it is determined if the vehicle has reached a position 700 meters ahead of a turn where the turn has a relatively small radius of curvature, for smooth travel through the turn at a relatively low speed. In another example, the distance is set to 300 meters when the road is an uphill grade, in which case the vehicle speed may be lowered sufficiently, even within a relatively short driving distance.

When the flag has been set to zero (YES at S18a), which means that the turn-making transmission control of this embodiment has already been initiated, it is then determined if the vehicle has already passed the peak of the turn (the "specific node point"), at S23a. This determines whether the turn-making transmission control of this embodiment should be continued or terminated. Until the vehicle reaches the peak point (NO at S23a), the procedure is ended (NO at S24a). S23a is operation of turn-peak passage discriminating means.

When detecting that the vehicle has reached the peak point (YES at S23a), a peak flag is set to one (at S25a) and the vehicle speed at the time of passing through the peak point is input (at S26a). And, by executing the following operation, the turn-making transmission control is terminated. After the vehicle has passed the peak point (NO at S23a), as far as the transmission control is still in operation (YES at S24a), the procedure is advanced to a step S27a.

In this embodiment, the turn-making transmission control is made inoperative in response to detection that the vehicle has passed the peak point (specific point). The specific point may be changed. For example, the turn-making transmission control may be terminated at the time when the vehicle reaches a point ⅔ through the entire turn, or when it overruns the peak point by a predetermined distance or by a predetermined period of time, or when it reaches a point on the turn that varies depending on a radius of curvature of the turn.

Navigation processing unit 11 further operates to input the transmission speed that has been selected by A/T ECU 40 (at S27a), and compares this with a transmission speed that has been selected by itself (at S28a). When both have selected the same transmission speed (YES at S28a), which means that application of the inventive transmission control of this embodiment is not necessary, the procedure is advanced to step S37a where the flag of this turn-making transmission control operation is set to zero. In this case, the automatic transmission is controlled in a normal manner by using the transmission map. When, on the contrary, navigation processing unit 11 and A/T ECU 40 have selected different transmission speeds (NO at S28a), the turn-making transmission control of this embodiment continues as follows for restricting an upshift, depending upon the vehicle speed.

Navigation processing unit 11 acquires the current vehicle speed Vnow and the peak-passage vehicle speed (at S29a), and determines if the current shift position is 2nd (at S30a). If the current shift position is 2nd (YES at S30a), it then determines if the current vehicle speed Vnow is equal to or exceeds a first upshift control speed (at S31a). The first upshift control speed is a critical point for allowing an upshift from 2nd to 3rd. The first upshift control speed has been determined by the peak-passage vehicle speed plus a predetermined speed (10 km/hour, for example) By way of example, if the vehicle passed the peak point at 35 km/hour, then the first upshift control speed is determined as 45 km/hour. The first upshift control speed is higher than a 2nd-to-3rd upshift point of the transmission map used in the normal transmission control.

In this embodiment, the peak-passage vehicle speed is used in determination of the first upshift control speed. In a modification, a vehicle speed after depressing the brake pedal or after releasing the brake pedal during driving around the turn is detected for use as a basis for determination of the first upshift control speed. In this case, the transmission is downshifted to 2nd when the brake pedal is engaged, as described later.

A second upshift control speed, that is a critical point for allowing an upshift from 3rd to 4th, is determined by the peak-passage vehicle speed plus another predetermined speed (25 km/hour, for example). If the vehicle passed the peak point at a speed of 35 km/hour, then the second upshift control speed may be determined as 60 km/hour. Similar to the first upshift control speed, the second upshift control speed is higher than a 3rd-to-4th upshift point of the transmission map used in the normal transmission control.

While the current vehicle speed Vnow is lower than the first upshift control speed (NO at S31a), a command designating 2nd as the upper limit is output (at S32a). In this situation, a downshift to 1st is permitted, but an upshift to 3rd is prohibited. A/T ECU 40 controls the transmission within such a selectable range. Then, a distance from the specific point (the specific node point) to the current position is calculated (at S35a), and it is determined if the calculated distance exceeds a predetermined distance (300 meters, for example) (at S36a). While the vehicle remains within the predetermined distance from the specific node point (NO at S36a), the procedure terminates, so that the turn-making control routine is continuously applied. When the vehicle reaches a position far from the specific node point (YES at S36a), which means that the vehicle has already escaped out of the control zone and the turn-making transmission control is no more required, the flag is set to zero (at S37a).

In S31a, when the vehicle speed increases to or above the first upshift control speed (YES at S31a), the current vehicle speed Vnow is then compared with the second upshift control speed (at S33a). When the current vehicle speed Vnow is equal to or higher than the first upshift control speed but still has not reached the second upshift control speed (NO at S33a), an upper-limit command designating 3rd is supplied (at S34a), whereby A/T ECU 40 selects an optimum transmission speed within a range of 1st to 3rd in response to the vehicle speed and the throttle opening. The succeeding steps have been described hereinbefore. In accordance with the transmission control of this embodiment, a 2nd-to-3rd upshift is executed at a vehicle speed higher than that executing the same upshift under normal transmission control. This means that 2nd shift position is kept for a longer period, which provides greater drive energy and more stabilized driving through a turn. Further, the vehicle may be readily accelerated after turning.

As long as the current vehicle speed Vnow is below the second upshift control speed (NO at S33a), an upper-limit command designating 3rd is outputted (at S34a). When the current vehicle speed Vnow exceeds the second upshift control speed (YES at S33a), which means that further prohibition against upshift to 3rd would cause the driver to have a uncomfortable feeling, the flag is set to zero (at S37a) and the peak flag is also set to zero (at S38a), to cancel this turn-making transmission control. Now, the procedure of the turn-making transmission control terminates, and the transmission is allowed to be upshifted to 4th in accordance with the normal transmission control.

The succeeding sub-routines S40a, S80a and S100a are the same as those in the first embodiment which have been described in detail with reference to the flowcharts of FIGS. 5, 8 and 10.

Figure 14:
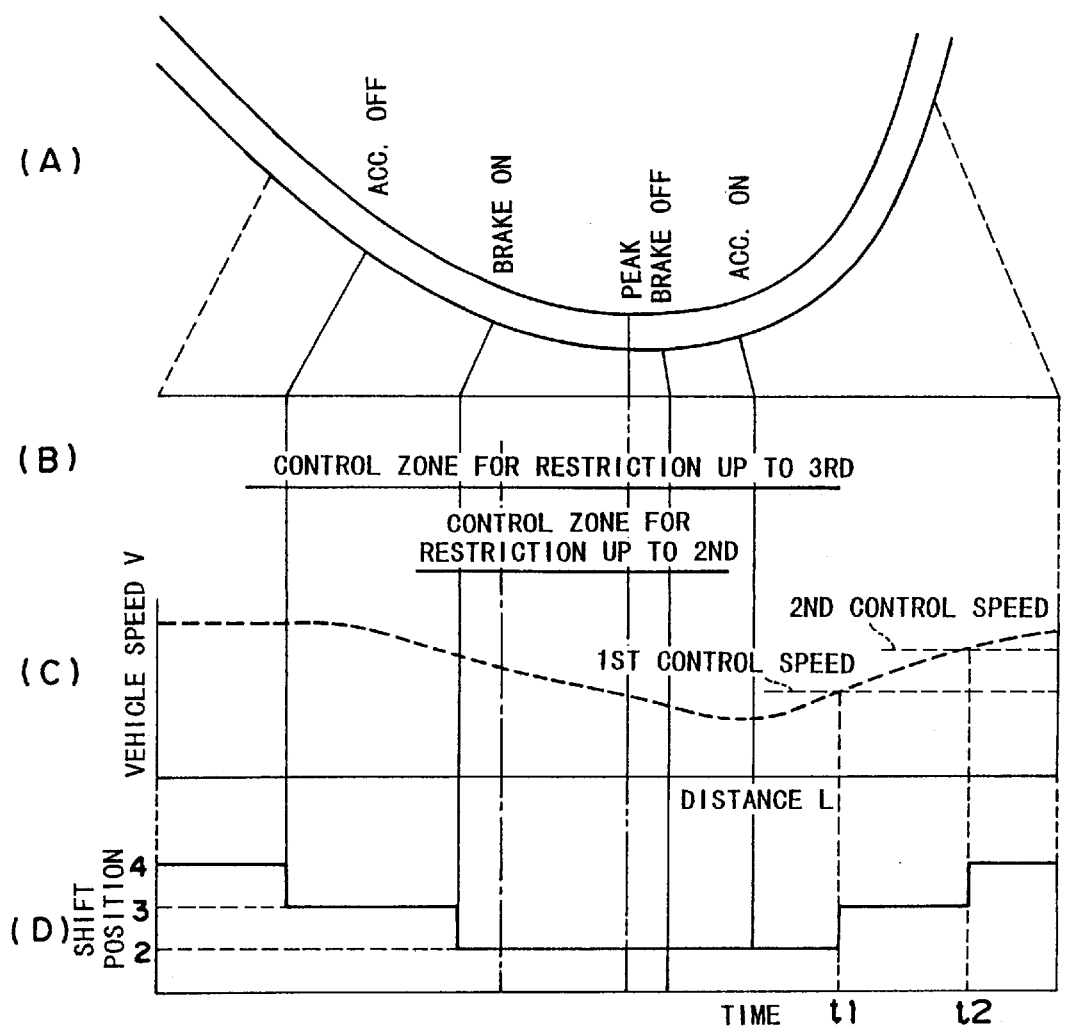
FIG. 14 is a time chart of control operations in the second embodiment.

Next, the above-described control operation will be illustrated by way of example, with reference to FIG. 14. FIG. 14(A) diagrammatically shows a road shape of a curve, FIG. 14(B) illustrates the upshift restricting control operation, FIG. 14(C) shows fluctuation of a vehicle speed during driving through the curve, and FIG. 14(D) shows shift change timing as a result of the transmission control according to this embodiment.

As described with reference to FIG. 7, navigation processing unit 11 executes a first upshift restricting control routine when the vehicle reaches a point a predetermined distance in advance of the peak point of the turn (the specific node point). In the example shown in FIG. 14, after the vehicle enters a first control zone where an upshift to 3rd is restricted (see FIG. 14(B)), the driver releases the accelerator pedal (see FIG. 14 (A)), whereby the transmission is automatically downshifted from 4th to 3rd, as shown in FIG. 14(D). This downshift provides a slowing of the vehicle by applying thereto a strong engine brake, as shown in FIG. 14(C). This downshift is carried out responsive to the driver's own operation of releasing the accelerator pedal, so that the driver does not have an uncomfortable feeling.

When the vehicle further advances to enter a second control zone where an upshift to 2nd is restricted (see FIG. 14 (B)), navigation processing unit 11 executes a second, more severe upshift restricting control. This control is actually carried out when the driver steps on the brake pedal, which should be regarded as his or her definite intention to decelerate, after the vehicle enters the second control zone, as clearly shown in FIG. 14 (D). This downshift provides a relatively great reduction of the vehicle speed by applying a stronger engine brake, as shown in FIG. 14 (C). This downshift is carried out followed by the driver's own operation of stepping on the brake, so that the driver does not have an uncomfortable feeling.

As shown in FIG. 14(A), after the vehicle passes through the peak of the turn, the driver releases the accelerator pedal. Further, after leaving the second control zone, the accelerator pedal is stepped on. However, in accordance with the turn-making control initiation/termination sub-routine shown in FIGS. 12 and 13, until the current vehicle speed Vnow reaches the first upshift control speed, an upshift from 2nd to 3rd is prohibited by the command outputted at S32a in FIG. 13. When the current vehicle speed Vnow is increased by stepping on the accelerator pedal to reach the first upshift control speed at a time t1, the upper-limit command designating 3rd is output from navigation processing unit 11 to A/T ECU 40 at S34*a* in FIG. 13. At this time, A/T ECU 40 has already selected, based on the vehicle speed and the throttle opening, 3rd or 4th speed in accordance with the transmission pattern of the normal transmission control. Thus, the transmission is automatically upshifted to 3rd in quick response to the upper-limit command of 3rd speed, at the time t1, as shown in FIG. 14(D).

Thereafter, the driver continues accelerating to smoothly drive out of the turn. Since the transmission remains in 3rd speed, smooth acceleration with a sufficient drive energy may be achieved.

When the vehicle speed Vnow reaches the second upshift control speed at a time t2, in accordance with operation at S37*a* where the upper-limit command designating 3rd is cancelled. Up to this time, since A/T ECU 40 has already selected 4th speed in accordance with the transmission pattern of the normal transmission control, the transmission is automatically shifted up to 4th in quick response to cancellation of the upper-limit command of 3rd speed, at the time t2, as shown in FIG. 14(D).

In this embodiment, during drive around the turn, an upshift is permitted, provided that the vehicle speed exceeds the upshift point of the transmission pattern in accordance with the normal transmission control. This achieves an appropriate upshift timing.

The first and second upshift control speeds are determined on the basis of a vehicle speed at a time when the driver releases the brake pedal. This is not limitative and may be modified provided they are higher than the upshift points of the normal transmission control.

As described above, the inventive transmission control of this embodiment will provide an appropriate shift change during a turn. When the vehicle is driving around the turn (curve), the driver operates, frequently and repeatedly, both the accelerator pedal and the brake pedal, resulting in fluctuation of the throttle opening. In this situation, the normal transmission control that controls shift changes depending upon the vehicle speed and the throttle opening is not always advantageous. Under the inventive turn-making transmission control operation of this embodiment, during driving around the turn, unnecessary and undesired upshift is restricted and a relatively low shift position is maintained, which produces greater drive energy and provides smooth and stabilized driving.

When the vehicle has passed the turn over a predetermined distance, the turn-making transmission control operation of this embodiment becomes inoperative so that an upshift may be made in accordance with the normal transmission control.

Third Embodiment

The transmission control of this embodiment executed by navigation processing unit 11 and A/T ECU 40 will be described with reference to the flowcharts of FIGS. 15 and 16. The flowchart of FIG. 15 shows an upper-limit setting routine by navigation processing unit 11.

Figure 15:
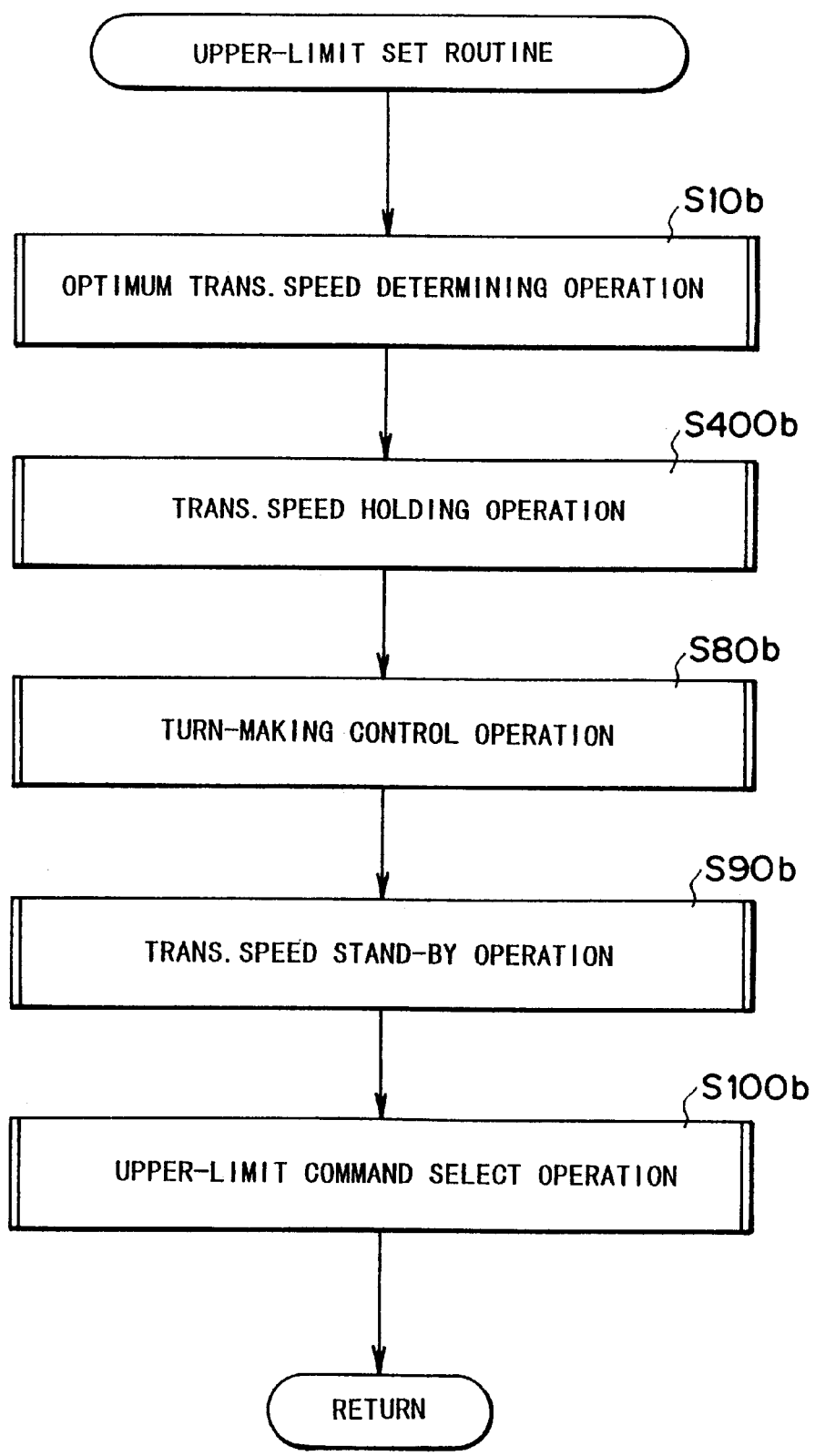
FIG. 15 is a flowchart of an upper-limit determining routine of a third embodiment.

As shown in FIG. 15, the upper-limit setting routine of this embodiment comprises sub-routines executing an optimum transmission speed determining operation (S10*b*), a transmission speed holding operation (S400b), a turn-making control operation (S80*b*), a transmission speed stand-by operation (S90*b*) and an upper-limit. command determining operation (S100*b*).

The sub-routines S10*b*, S80*b*, S90*b* and S100*b* are the same as those in the first embodiment and, therefore, need no further description here.

FIG. 16 shows a sub-routine of the transmission speed holding operation which is carried out based on an optimum transmission speed determined by the preceding sub-routine S10*b*. As shown, when the optimum transmission speed is 4th speed (YES at S22*b*), that is the highest speed in a 4-speed transmission, an upper-limit command designating 4th speed is output (at S38*b*), then the procedure is returned.

When the optimum transmission speed determined by the sub-routine S10*b* is 3rd speed (No at S22*b* and YES at S24*b*), the current shift position is confirmed at S26*b*. When the current shift position is 4th, the upper-limit command designating 4th speed is output (at S38*b*), then the procedure is returned. When the current shift position is 3rd, the upper-limit command designating 3rd speed is output (at S28*b*), then the procedure is returned.

When the current shift position is 2nd, the upper-limit command designating 3rd speed is output (at S28*b*), as in the case of 3rd speed. This prevents application of the too low gear ratio of 2nd speed and allows an upshift to 3rd which has been determined as the optimum transmission speed (at S24*b*).

When the optimum transmission speed determined by the sub-routine Sl0*b* is 2nd speed (NO at S22*b* and S24*b* and YES at S30*b*), the current shift position is confirmed at S32*b*. Depending upon the current shift position, the upper limit commands are output at S34*b*, S36*b* and S38*b*, respectively, so that no upshift from the current shift position is permitted. As above described, the transmission speed holding operation determines the first upper-limit transmission speed to restrict an unnecessary upshift from the current shift position.

Next, the turn-making control operation S80*b* determines the upper-limit transmission speed in response to an "event", in the above-described manner. The transmission speed stand-by operation also determines the upper-limit transmission speed, in the above-described manner. Among these three upper-limit transmission speeds, the lowest one is selected by the upper-limit command select operation S100*b*, and the selected speed is supplied to A/T ECU 40.

As described above, this embodiment includes the transmission speed holding operation (S40), as well as the turn-making control operation (S80*b*). This prohibits an upshift according to the normal transmission pattern or shift map, thereby facilitating smooth downshift control. More particularly, even when there is a release of the accelerator pedal, that is an "event" for commencing the turn-making transmission control of the present invention, the current shift position is maintained by the holding operation (S40), which would otherwise be upshifted in response to the release of the accelerator pedal under the normal transmission control.

Although a 4-speed automatic transmission is referred to in the forgoing three embodiments,, this invention is of course applicable to a 3-speed or 5-speed automatic transmission, and further to a stageless automatic transmission utilizing an endless belt. When this invention is applied to the multi-speed transmission, not the upper-limit transmission speed but the upper-limit gear ratio is controlled.

INDUSTRIAL APPLICABILITY

As having been described, the present invention relates to the vehicle control device that is especially useful in automatic transmission control. In particular, this invention may be used in combination with a navigation system for automatic transmission control by utilizing road data and other data held in the navigation system.

What is claimed is:

1. A vehicle control device comprising road information obtaining means for obtaining road information, current position sensor means for detecting an on-road current position of a vehicle, an automatic transmission, optimum gear-ratio determining means for determining, in accordance with said road information, an optimum gear-ratio at which the vehicle could run from the current position detected by said current position sensor means through a specific forward position, decelerating operation sensor means for detecting that a driver begins decelerating operation, drive condition sensor means for detecting drive condition including a vehicle speed, primary upper-limit set means for determining said optimum gear-ratio determined by said optimum gear-ratio determining means as a primary upper-limit gear-ratio, in response to detection of initiation of the driver's decelerating operation by said decelerating operation sensor means, secondary upper-limit set means for determining a specific gear-ratio as a secondary upper-limit gear-ratio, independent of detection of initiation of said driver's decelerating operation, after determination of said primary upper-limit gear-ratio by said primary upper-limit set means, upper-limit gear-ratio determining means for comparing said primary and secondary upper-limit gear-ratios to select a lower one and outputting an upper-limit command designating said selected gear-ratio, and restriction means for restricting a shiftable range of said automatic transmission by setting said upper-limit gear-ratio designated by said upper-limit command.

2. A vehicle control device for controlling an automatic transmission having a shiftable range of gear ratios, said control device comprising:

road information obtaining means for obtaining road information for a road;

current position sensor means for detecting an on-road current position of the vehicle on the road;

optimum gear-ratio determining means for determining, in accordance with said road information, an optimum gear ratio for the vehicle in travel from the current position detected by said current position sensor means through a specific forward position in advance of the vehicle on the road;

decelerating operation sensor means for detecting start of a deceleration operation by a driver;

drive parameter sensor means for detecting at least one of driving parameters including vehicle speed;

primary upper-limit setting means for setting the optimum gear-ratio determined by said optimum gear ratio determining means as a primary upper-limit gear ratio, in response to detection of start of the driver's deceleration operation by said decelerating operation sensor means;

secondary upper-limit setting means for determining a specific gear ratio as a secondary upper-limit gear ratio, independent of detection of initiation of the driver's deceleration operation, after the setting of the primary upper-limit gear ratio by said primary upper-limit setting means;

upper-limit gear ratio determining means for comparing the set primary and secondary upper-limit gear ratios, for selecting the lower of said primary and secondary upper-limit gear ratios and for outputting an upper-limit command designating the selected lower gear ratio; and range restriction means for restricting the shiftable range of the automatic transmission to the upper-limit gear ratio designated by said upper-limit command.

3. A vehicle control device according to claim 2 wherein said secondary upper-limit setting means determines the secondary upper-limit gear ratio in accordance with the detected vehicle speed.

4. A vehicle control device according to claim 3 wherein said secondary upper-limit setting means includes means for calculating a reference vehicle speed and for determining the secondary upper-limit gear ratio by comparing the vehicle speed detected by said vehicle speed sensor with the reference vehicle speed.

5. A vehicle control device according to claim 2 wherein said drive condition sensor means includes a current gear ratio sensor that detects a current gear ratio, and said secondary upper-limit setting means setting the secondary upper-limit gear ratio in accordance with the detected current gear ratio.

6. A vehicle control device according to claim 5 wherein said secondary upper-limit setting means compares the detected current gear ratio with the optimum gear ratio determined by said optimum gear ratio determining means, and sets the current gear ratio as the secondary upper-limit gear ratio when the optimum gear ratio is larger.

7. A vehicle control device according to claim 2 wherein said secondary upper-limit setting means includes curve detecting means for detecting a curve on the road in advance of the vehicle, said secondary upper-limit setting means determining the secondary upper-limit gear ratio in accordance with a vehicle speed for travel through the curve and the detected current vehicle speed.

8. A vehicle control device according to claim 7 wherein said drive parameter sensor means further includes a current gear ratio sensor that detects a current gear ratio, and said secondary upper-limit setting means further includes means for determining entry of the vehicle into the curve and exit of the vehicle from the curve, and wherein said secondary upper-limit setting means determines the secondary upper-limit gear ratios in accordance with the vehicle speed at the time of entry into the curve, the detected current gear ratio and an increase in the vehicle speed upon exiting the curve.

9. A vehicle control device according to claim 7 wherein said secondary upper-limit setting means further includes means for determining that the vehicle has overrun the curve by a predetermined distance, and wherein said secondary upper-limit set means discontinues the upper-limit determining operation for the curve responsive to a determination that the vehicle has overrun the curve by said predetermined distance.

10. The vehicle control device according to claim 7 wherein the curve is represented by a series of nodes included in the road information.

11. The vehicle control device according to claim 7 wherein the curve includes a specific forward point.

12. A vehicle control device for controlling an automatic transmission having a full shiftable range of gear ratios, said control device comprising:

road information obtaining means for obtaining road information for a road;

current position sensor means for detecting an on-road current position of the vehicle on the road;

recommended speed calculating means for calculating, in accordance with the road information, a recommended vehicle speed for a time at which the vehicle will pass through a specific position on the road;

distance calculating means for calculating a sectional distance from the current position to the specific position;

vehicle speed sensor means for detecting a current vehicle speed;

reference speed calculating means for calculating a reference vehicle speed at the current vehicle position in accordance with the recommended vehicle speed and the sectional distance;

decelerator operation sensor means for detecting start of a deceleration operation by a driver of the vehicle;

discrimination means for determining if the current vehicle speed exceeds the reference vehicle speed;

first restriction means for reducing the full shiftable range of gear ratios, responsive to detection of start of the driver's deceleration operation, when said discriminating means determines that the current vehicle speed exceeds the reference vehicle speed; and second restriction means for determining a second restricted shiftable range of the gear ratios, in accordance with the detected current vehicle speed, regardless of detection of a deceleration operation.

13. A vehicle control device for controlling an automatic transmission having a full shiftable range of gear ratios, said control device comprising:

road information obtaining means for obtaining road information for a road;

current position sensor means for detecting an on-road current position of the vehicle on the road;

recommended speed calculating means for calculating, in accordance with the road information, a recommended vehicle speed for a time at which the vehicle will pass through a specific position on the road;

distance calculating means for calculating a sectional distance from the current position to the specific position;

vehicle speed sensor means for detecting a current vehicle speed;

reference speed calculating means for calculating a reference vehicle speed at the current vehicle position in accordance with the recommended vehicle speed and the sectional distance;

accelerator sensor means for detecting release of an accelerator;

discrimination means for determining if the current vehicle speed exceeds the reference vehicle speed;

upper-limit restriction means for lowering an upper-limit of the full shiftable range, responsive to detection of release of the accelerator by said accelerator sensor means, when said discriminating means determines that the current vehicle speed exceeds the reference vehicle speed; and up-shift prohibiting means for prohibiting an up-shift from current transmission speed, when said discriminating means determines that the current vehicle speed exceeds the reference vehicle speed and release of the accelerator is not detected.

14. The vehicle control device according to claim 12 or 13 wherein said recommended speed calculating means calculates the recommended vehicle speed in accordance with the road shape of a predetermined section length of the road which includes the specific position.

15. The vehicle control device according to claim 12 or 13 wherein said recommended speed calculating means calculates the recommended vehicle speed in accordance with radius of curvature of a predetermined section of the road which includes the specific position.

16. A vehicle control device for controlling a down-shift of an automatic transmission in response to a driver's operation indicative of an intent to decelerate, which comprises decelerating operation sensor means for detecting the driver's operation, and up-shift prohibiting means for prohibiting an up-shift in response to detection of said driver's operation.

17. The vehicle control device according to claim 2, 12 or 16 wherein said decelerating operation sensor means detects an inoperative status of an accelerator pedal and/or an operative status of a brake pedal.

18. The vehicle control device according to claim 2, 12 or 16 wherein said decelerating operation sensor means detects at least one of switching on of a headlamp, switching on of a turn indicating signal, switching on of a wiper switch, decrease in degree of accelerator pedal operation and operation of a brake pedal.

19. The vehicle control device according to claim 17 wherein said inoperative status of the accelerator pedal is where degree of accelerator pedal depression is approximately zero.

20. The vehicle control device according to claim 13 wherein said accelerator sensor detects release of the accelerator when a degree of accelerator pedal depression becomes approximately zero.

21. The vehicle control device according to claim 17 wherein said inoperative status of the accelerator pedal is where degree of accelerator pedal depression is decreased by a predetermined ratio.

22. The vehicle control according to claim 13 wherein said accelerator sensor detects release of the accelerator when a degree of accelerator depression decreases a predetermined amount.

23. The vehicle control device according to claim 17 wherein said inoperative status of the accelerator pedal is determined responsive to detection of at least one of a predetermined fractional change in accelerator pedal depression, a predetermined amount of reduction in accelerator pedal depression, a predetermined rate of reduction in accelerator pedal depression, and a predetermined deceleration.

24. The vehicle control device according to claim 13 wherein said accelerator sensor detects release of the accelerator as at least one of a predetermined percentage change in accelerator position, a predetermined amount of reduction in extent of accelerator operation, and a predetermined rate of change in reduction of extent of accelerator operation.

25. The vehicle control device according to claim 17 wherein said inoperative status of the accelerator pedal is detected as at least one of a predetermined fraction of change in a throttle opening, a predetermined amount of reduction in a throttle opening, a predetermined rate of reduction in a throttle opening and a predetermined deceleration.

26. The vehicle control device according to claim 13 wherein said accelerator sensor detects release of the accelerator as at least one of a predetermined fraction of change in a throttle opening, a predetermined amount of reduction in a throttle opening, a predetermined rate of reduction in a throttle opening and a predetermined deceleration.

27. The vehicle control device according to claims 2, 12, 13 or 16 further comprising drive route searching means for determining a scheduled drive route for the vehicle, and specific position sensor means for obtaining position data for a specific position on the scheduled drive route from said road information.

28. The vehicle control device according to claim 25 which further comprises destination setting means for setting a destination and wherein said drive route searching means sets, as said scheduled drive route, a drive route to the destination when the destination has been set and an imaginary drive route from the current position in current vehicle direction when the destination has not been set.

29. The vehicle control device according to claim 2 further comprising shift-position sensor means, mechanically or electrically connected to the automatic transmission, for detecting current shift position, said primary and secondary upper-limit setting means determining the primary and second upper-limits respectively when said shift-position sensor means detects that said current shift position is a drive range position.

30. A vehicle control device for controlling an automatic transmission having a full shiftable range of gear ratios, said control device comprising:

current position sensor means for detecting an on-road current position of the vehicle on a road;

road information obtaining means for obtaining road information for the road;

curve sensor means for detecting a curve ahead of the current position in accordance with the road information;

down-shift means for commanding a down-shift as the vehicle approaches a predetermined position related to the curve;

passage discriminating means for determining when the vehicle has passed the predetermined position; and up-shift restriction means for prohibiting an up-shift from current transmission speed until said passage discrimination means determines that the vehicle has passed the predetermined position, said up-shift restriction means allowing an up-shift from the current transmission speed at a higher vehicle speed than that dictating an up-shift in normal transmission control, after the vehicle has passed the predetermined position.

31. A vehicle control device for controlling an automatic transmission having a full shiftable range of gear ratios, said control device comprising:

current position sensor means for detecting an on-road current position of the vehicle on a road;

road information obtaining means for obtaining road information for the road;

curve sensor means for detecting a curve ahead of the current position in accordance with the road information;

down-shift means for commanding a down-shift as the vehicle approaches a predetermined position related to the curve;

passage discriminating means for determining when the vehicle has passed the predetermined position;

vehicle speed memory means for storing vehicle speed detected at a time when the vehicle passes the predetermined position; and up-shift restriction means for prohibiting an up-shift from current transmission speed until said passage discriminating means determines that the vehicle has passed the predetermined position, and until the vehicle speed is detected to have increased to a predetermined speed that is higher than the vehicle speed detected at the time of passing the predetermined position.

32. A vehicle control device for controlling an automatic transmission having a full shiftable range of gear ratios, said control device comprising:

current position sensor means for detecting an on-road current position of the vehicle on a road;

road information obtaining means for obtaining road information for the road;

curve sensor means for detecting a curve ahead of the current position in accordance with the road information;

distance discriminating means for determining if the vehicle has overrun the predetermined position by a predetermined distance;

down-shift means for commanding a down-shift before the vehicle passes a predetermined position related to the curve; and up-shift restriction means for prohibiting an up-shift from current transmission speed until said distance discriminating means has determined that the vehicle has overrun the determined position by the predetermined distance.

\* \* \* \* \*